(12) United States Patent
Duan et al.

(10) Patent No.: US 11,635,485 B2
(45) Date of Patent: Apr. 25, 2023

(54) POSITIONING REFERENCE SIGNAL (PRS) MEASUREMENT WINDOW ADAPTATION

(71) Applicant: QUALCOMM Incorporated, San Diego, CA (US)

(72) Inventors: Weimin Duan, San Diego, CA (US); Alexandros Manolakos, Escondido, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/406,300

(22) Filed: Aug. 19, 2021

(65) Prior Publication Data

US 2022/0057474 A1 Feb. 24, 2022

Related U.S. Application Data

(60) Provisional application No. 63/068,704, filed on Aug. 21, 2020.

(51) Int. Cl.
*G01S 5/10* (2006.01)
*H04W 4/029* (2018.01)

(52) U.S. Cl.
CPC .............. *G01S 5/10* (2013.01); *H04W 4/029* (2018.02)

(58) Field of Classification Search
CPC ........ G01S 5/10; G01S 5/0205; G01S 5/0236; H04W 4/029; H04L 5/0048; H04L 27/2613
See application file for complete search history.

(56) References Cited

U.S. PATENT DOCUMENTS

2017/0111880 A1* 4/2017 Park .................. H04W 64/00
2020/0204317 A1* 6/2020 Kim .................. H04W 56/00

OTHER PUBLICATIONS

AT&T., et al., "RAN1 UE Features List for Rel-16 NR after RAN1#100-E," 3GPP Draft, 3GPP TSG RAN WG1 #100-e, e-Meeting, R1-2001484, 3RD Gen Partnership Project (3GPP), Mobile Competence Centre, 650, Route Des Lucioles, F-06921, Sophia-Antipolis Cedex, FR, vol. RAN WG1, No. e-mtg, Feb. 24, 2020-Mar. 6, 2020, Apr. 10, 2020 (Apr. 10, 2020), XP051873231,pp. 1-237, Retrieved from Internet: URL: https://ftp.3gpp.org/tsg_ran/WG1_RL1/TSGR1_100_e/Docs/R1-2001484.zip_R1-2001484_rel16_RAN1_UE_features_NR_afterR1#100E.docx,pp. 176,177,sec 4, p. 119-p. 123.

(Continued)

*Primary Examiner* — Kabir A Timory
(74) *Attorney, Agent, or Firm* — Muncy, Geissler, Olds & Lowe, P.C./Qualcomm

(57) ABSTRACT

Disclosed are various techniques for wireless positioning. In an aspect, the time that a user equipment (UE) spends on performing positioning reference signal (PRS) measurements is reduced, by lengthening the PRS measurement period (P) and/or by reducing the PRS symbol duration (K). These modifications may be performed by the UE or by a location management server or other network node and may be made in consideration of the UE's mobility status and other environmental or operating conditions of the UE. In an aspect, a network entity may determine P and K to be used by the UE, and may indicate, to the UE, the P and the K to be used by the UE for measuring at least one PRS. The UE may then use the P and the K for measuring at least one PRS.

30 Claims, 17 Drawing Sheets

(56) References Cited

OTHER PUBLICATIONS

Intel Corp: "Further Discussion on NR PRS RSTD Requirements", 3GPP TSG-RAN WG4 Meeting # 96-e, 3GPP Draft, R4-2009741, 3rd Gen Partnership Project (3GPP), Mobile Competence Centre, 650, Route Des Lucioles, F-06921 Sophia-Antipolis Cedex,FR,vol. RAN WG4,No. Electronic Mtg,Aug. 17, 2020-Aug. 28, 2020,Aug. 7, 2020(Aug. 7, 2020) 11 Pgs,XP051912827,Retrieved from Internet:URL:https://ftp.3gpp.org/tsg_ran/WG4_Radio/TSGR4_96_e/Docs/R4-2009741.zip R4-2009741 Further considerations on PRS RSTD require's r1.docx [retrieved Aug. 7, 2020]whole doc.
International Search Report and Written Opinion—PCT/US2021/046941—ISA/EPO—dated Jan. 7, 2022.
Moderator (Intel Cor): "Summary of the RAN1 WG E-mail, Discussion [100b-e-NR-Pos-01]", 3GPP Draft, 3GPP TSG RAN WG1 #100bis-E, R1-2002770,3rd Gen Partnership Project(3GPP)Mobile Competence Centre,650, Route Des Lucioles,F-06921 Sophia-Antipolis Cedex,FR,vol. RAN WG1,No. e-Mtg,Apr. 20, 2020-Apr. 30, 2020,May 1, 2020 May 1, 2020),XP051879481,27 Pgs,Retrieved Internet:URL:https://ftp.3gpp.org/tsg_ran/WG1_RL1/TSGR1_100b_e/Docs/R1-2002770.zip_R1-2002770[100b-e-NR-Pos-01]docx[Retrieved May 1, 2020]Sec 2.4,p. 1,para2.1.1-p. 7,para2.1.2.

\* cited by examiner

POSITIONING REFERENCE SIGNAL (PRS) MEASUREMENT WINDOW ADAPTATION

CROSS-REFERENCE TO RELATED APPLICATION

This application claims the priority of U.S. Provisional Application No. 63/068,704, entitled "POSITIONING REFERENCE SIGNAL (PRS) MEASUREMENT WINDOW ADAPTATION," filed Aug. 21, 2020, which is assigned to the assignee hereof and herein incorporated by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards. These advancements, as well as the use of higher frequency bands, advances in positioning reference signal processes and technology, and high-density deployments for 5G, enable highly accurate 5G-based location.

SUMMARY

Disclosed are various techniques for wireless communication. In an aspect, the time that a user equipment (UE) spends on performing positioning reference signal (PRS) measurements is reduced, by lengthening the PRS measurement period (P) and/or by reducing the PRS symbol duration (K). These modifications may be performed by the UE or by a location management server (LMS) or other network node and may be made in consideration of the UE's mobility status and other environmental or operating conditions of the UE.

The techniques described herein provide a number of technical benefits, including but not limited to improving device efficiency, reducing power consumption, and reducing complexity of a UE, by reducing the amount of time that the UE spends performing PRS measurements.

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a network entity includes determining a positioning reference signal (PRS) measurement window period value (P) and a minimum PRS symbol duration value (K) to be used by a user equipment (UE); and transmitting, to the UE, an indication of the P and the K to be used by the UE for measuring at least one PRS.

In an aspect, a method of wireless communication performed by a UE includes receiving, from a network entity, a P, or an indication thereof, and a K, or an indication thereof, and measuring, based at least in part on the P and the K, at least one PRS.

In an aspect, a network entity includes a memory, at least one transceiver, and at least one processor communicatively coupled to the memory and the at least one transceiver, the at least one processor configured to: determine a P and a K to be used by a UE, and transmit, via the at least one transceiver, to the UE, an indication of the P and the K to be used by the UE for measuring at least one PRS.

In an aspect, a UE includes a memory, at least one transceiver, and at least one processor communicatively coupled to the memory and the at least one transceiver, the at least one processor configured to: receive, via the at least one transceiver, from a network entity, an indication of a P and a K, and use the P and the K for measuring at least one PRS.

In an aspect, a network entity includes means for determining a P and a K to be used by a UE, and means for transmitting, to the UE, an indication of the P and the K to be used by the UE for measuring at least one PRS.

In an aspect, a UE includes means for receiving, from a network entity, an indication of a P and a K, and means for measuring, based at least in part on the P and the K, at least one PRS.

In an aspect, a non-transitory computer-readable medium storing computer-executable instructions that, when executed by a network entity, cause the network entity to determine a P and a K to be used by a UE, and transmit, to the UE, an indication of the P and the K to be used by the UE for measuring at least one PRS.

In an aspect, a non-transitory computer-readable medium storing computer-executable instructions that, when executed by a UE, cause the UE to receive, from a network entity, an indication of a P and a K, and use the P and the K for measuring at least one PRS.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
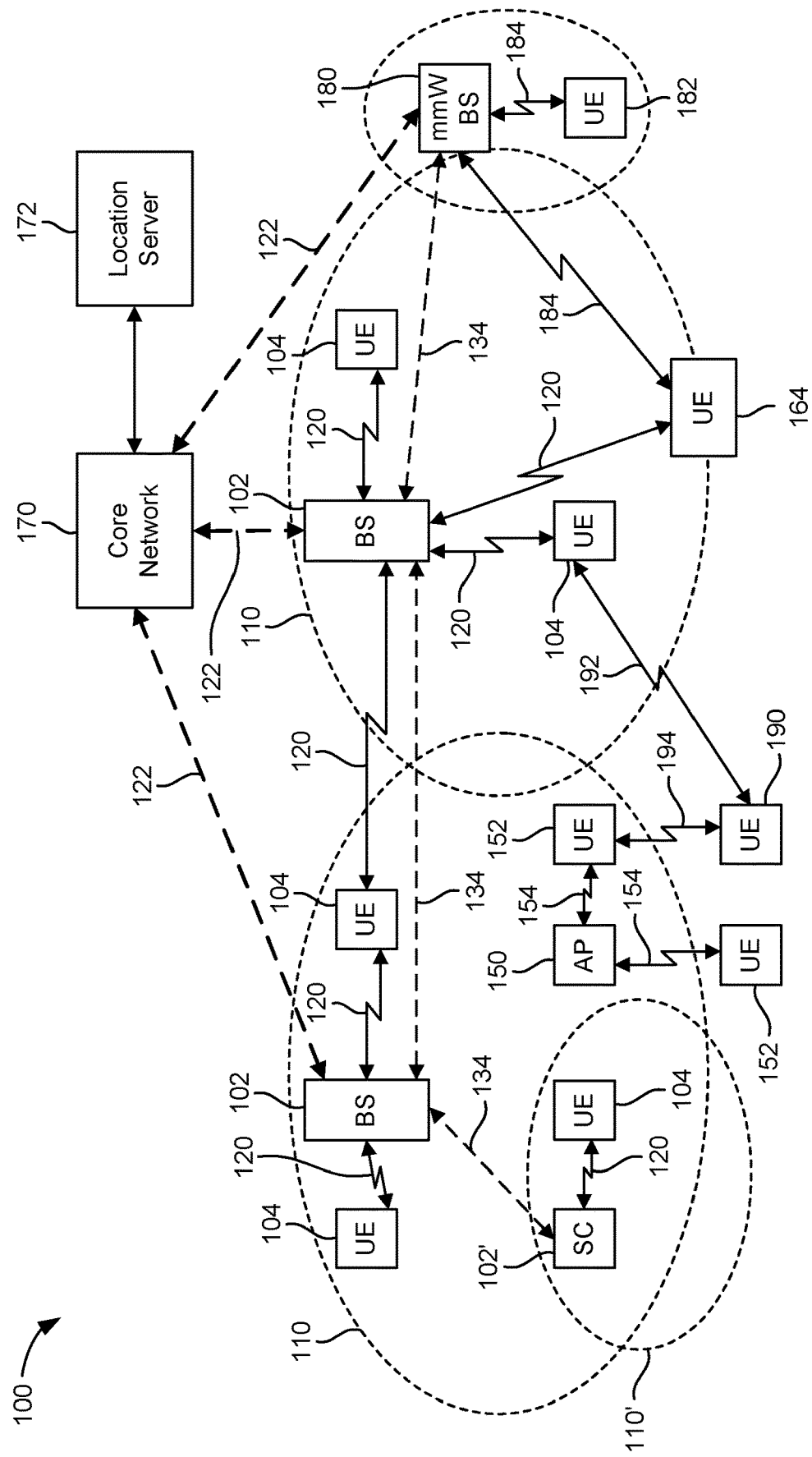
FIG. 1 illustrates an exemplary wireless communications system, according to various aspects.

Disclosed are various techniques for wireless communication. In an aspect, the time that a user equipment (UE) spends on performing positioning reference signal (PRS) measurements is reduced, by lengthening the PRS measurement period (P) and/or by reducing the PRS symbol duration (K). These modifications may be performed by the UE or by a location management server (LMS) or other network node and may be made in consideration of the UE's mobility status and other environmental or operating conditions of the UE.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (UT), a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an exemplary wireless communications system 100 according to various aspects. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more, or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
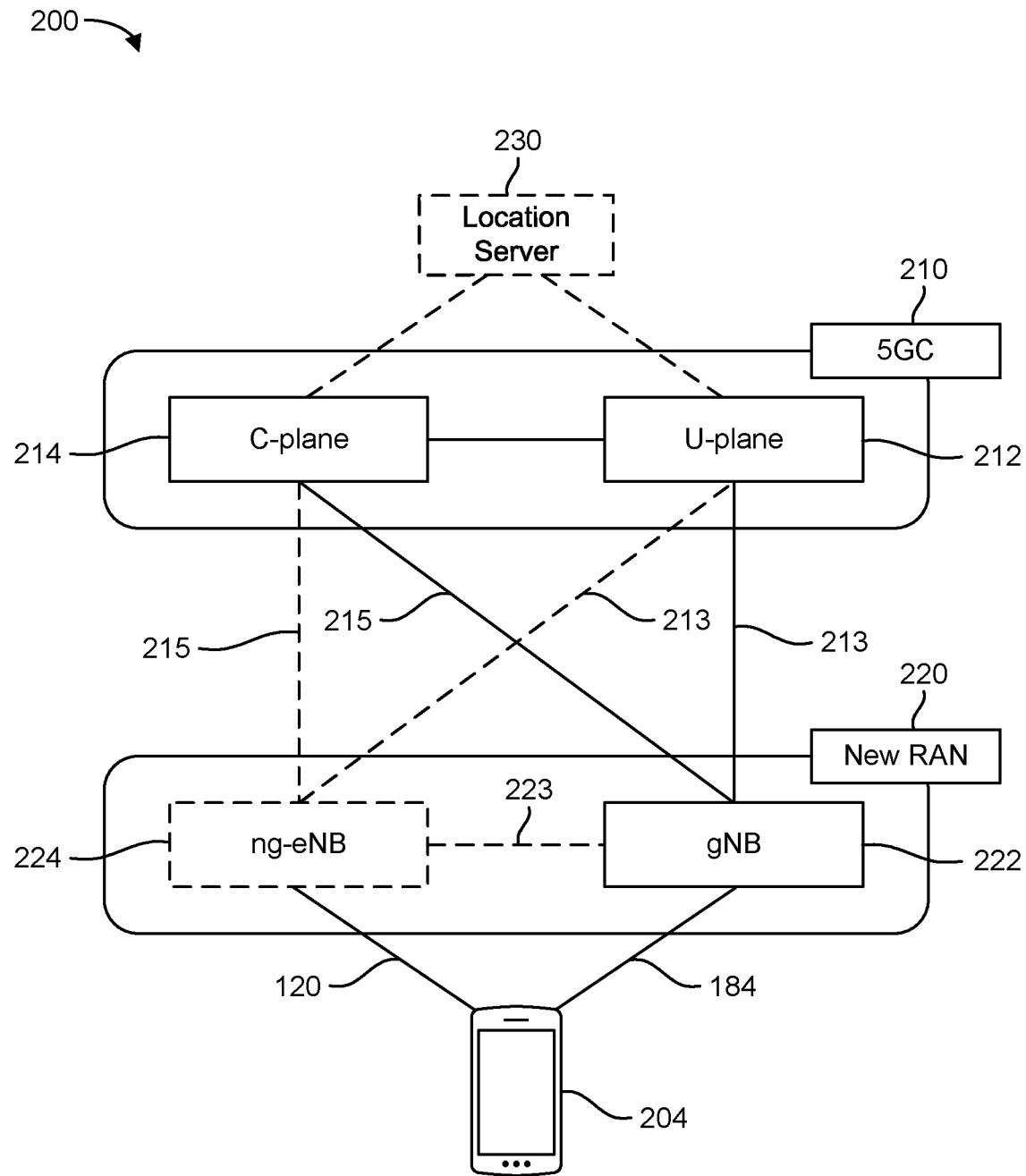
FIGS. 2A and 2B illustrate example wireless network structures, according to various aspects.

FIG. 2A illustrates an example wireless network structure 200 according to various aspects. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include a location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
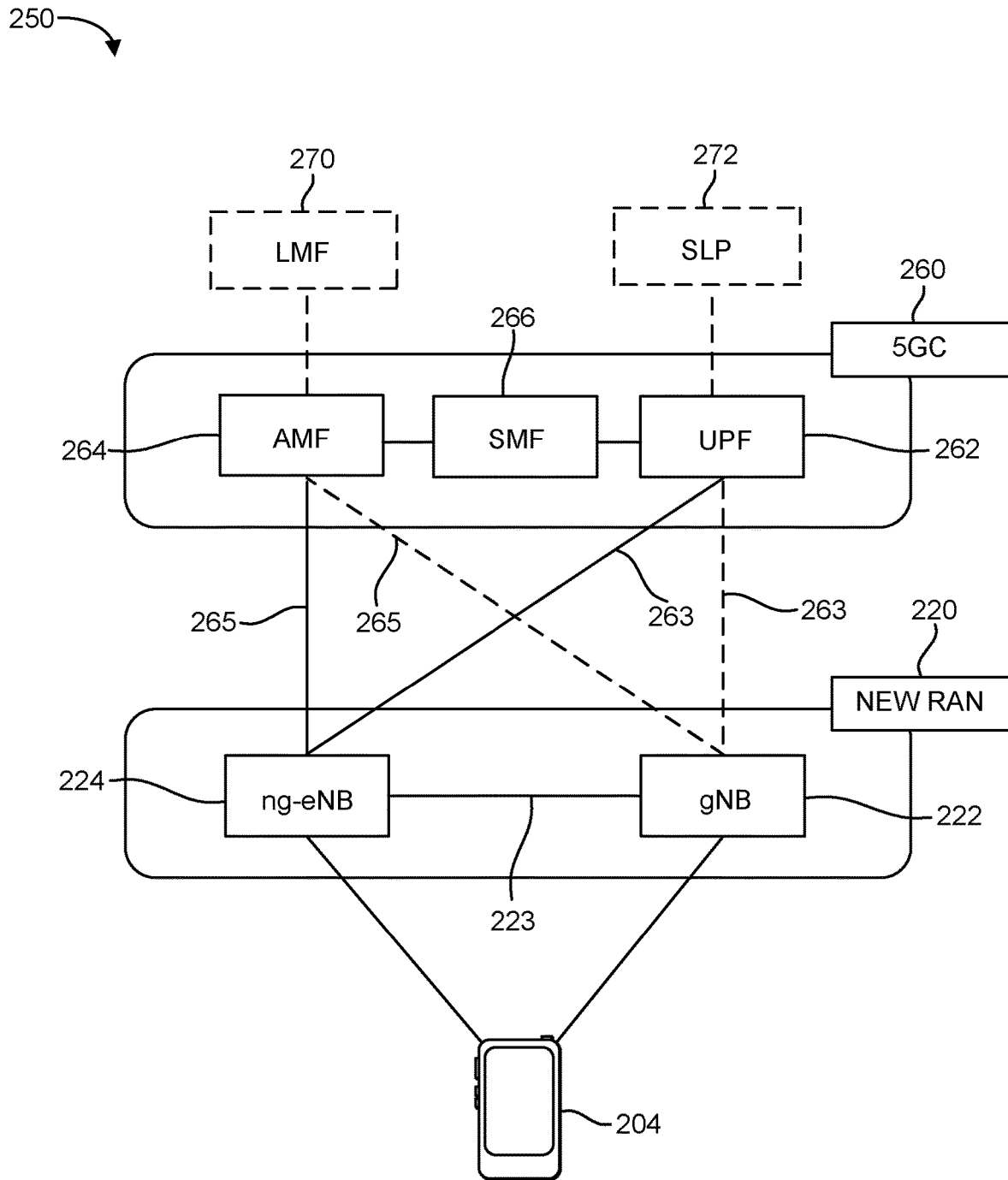

FIG. 2B illustrates another example wireless network structure 250 according to various aspects. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a location management component (LMC). However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
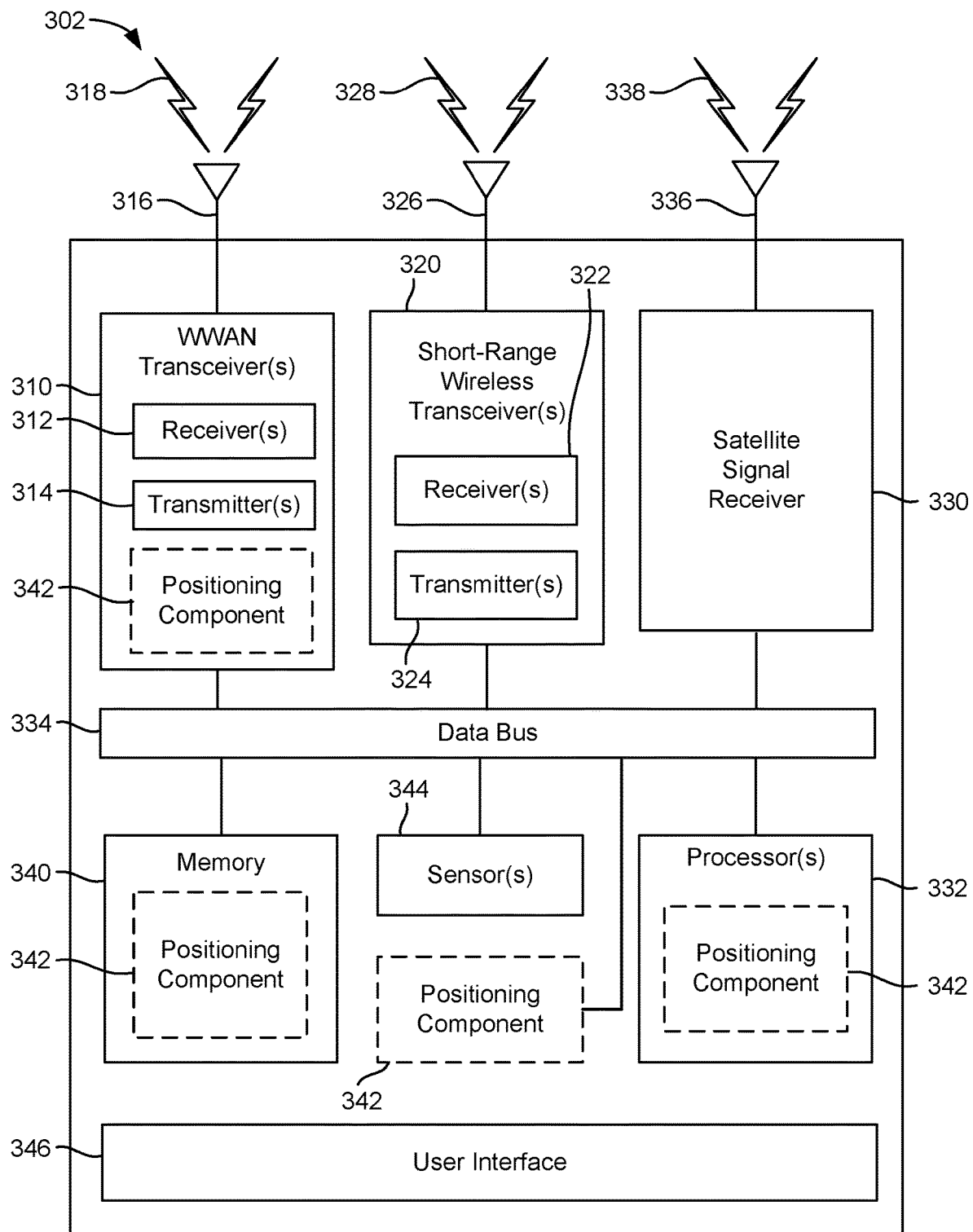
FIGS. 3A, 3B, and 3C are simplified block diagrams of several sample aspects of components that may be employed in a user equipment (UE), a base station, and a network entity, respectively, and configured to support communications as taught herein.
Figure 3B:
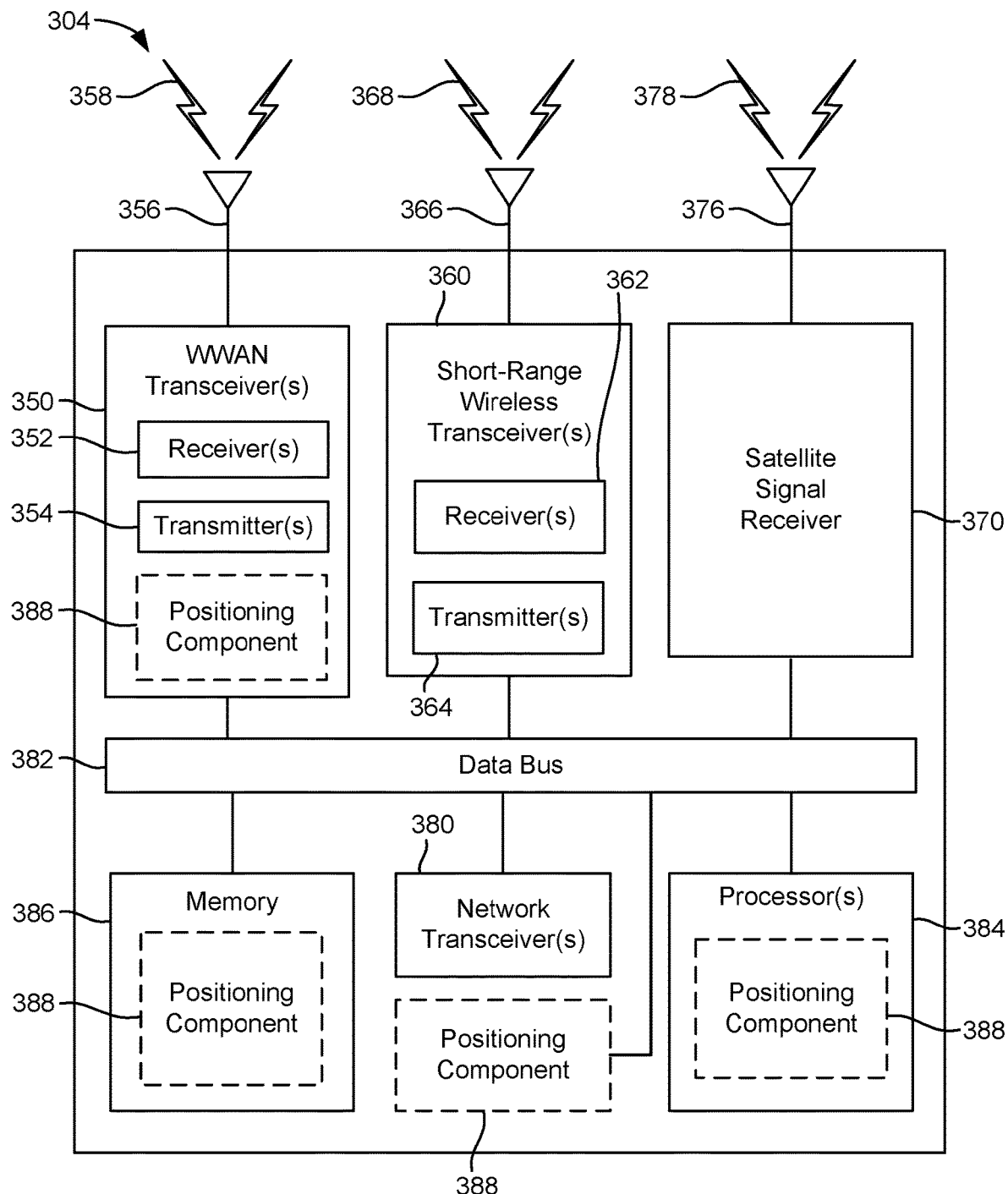
Figure 3C:
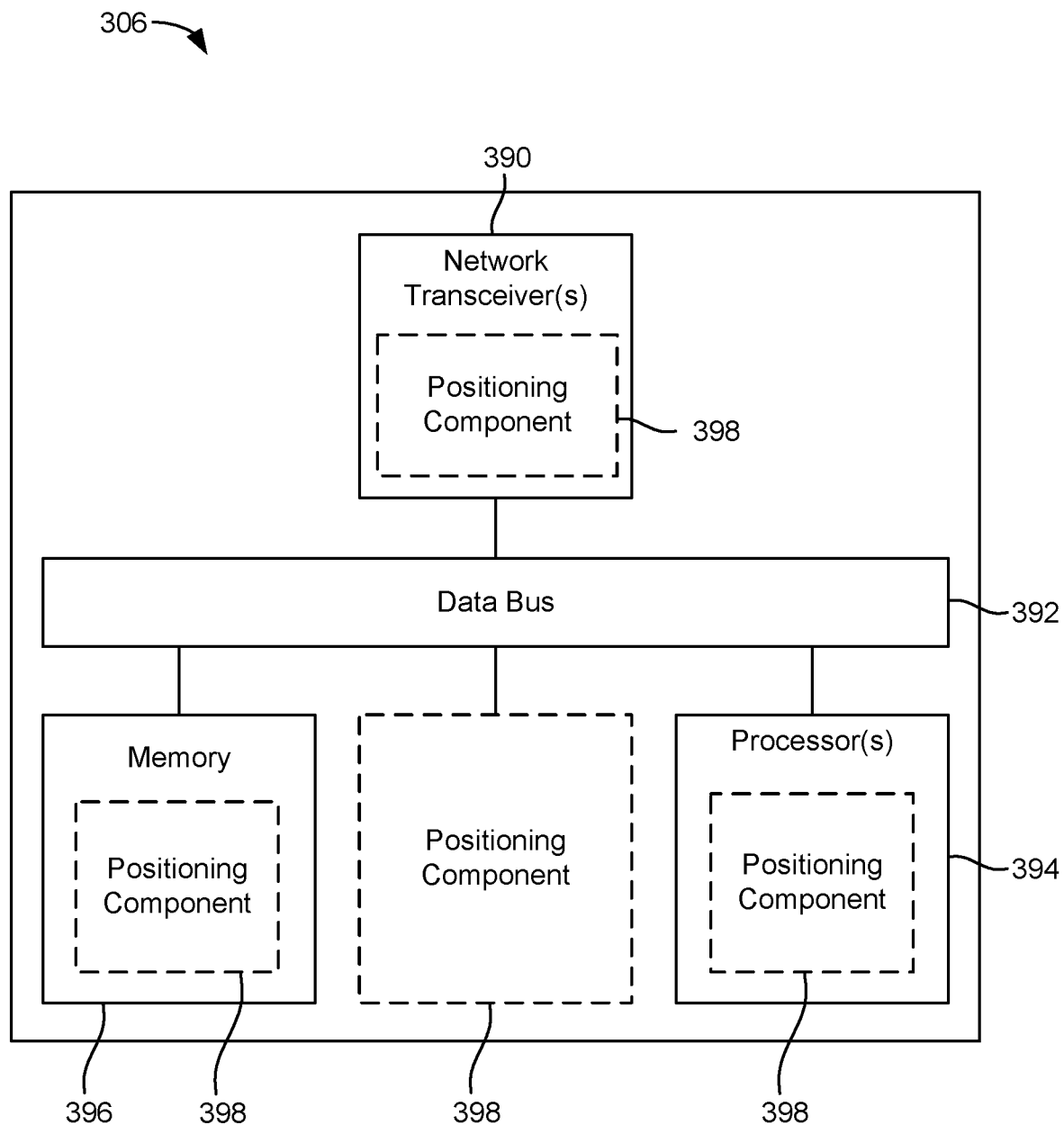

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator.

The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods.

Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, NRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270, SLP 272) may provide assistance data to the UE. For example, the assistance data may include identifiers of the base stations (or the cells/ TRPs of the base stations) from which to measure reference signals, the reference signal configuration parameters (e.g., the number of consecutive positioning slots, periodicity of positioning slots, muting sequence, frequency hopping sequence, reference signal identifier (ID), reference signal bandwidth, slot offset, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Various frame structures may be used to support downlink and uplink transmissions between network nodes (e.g., base stations and UEs).

Figure 4A:
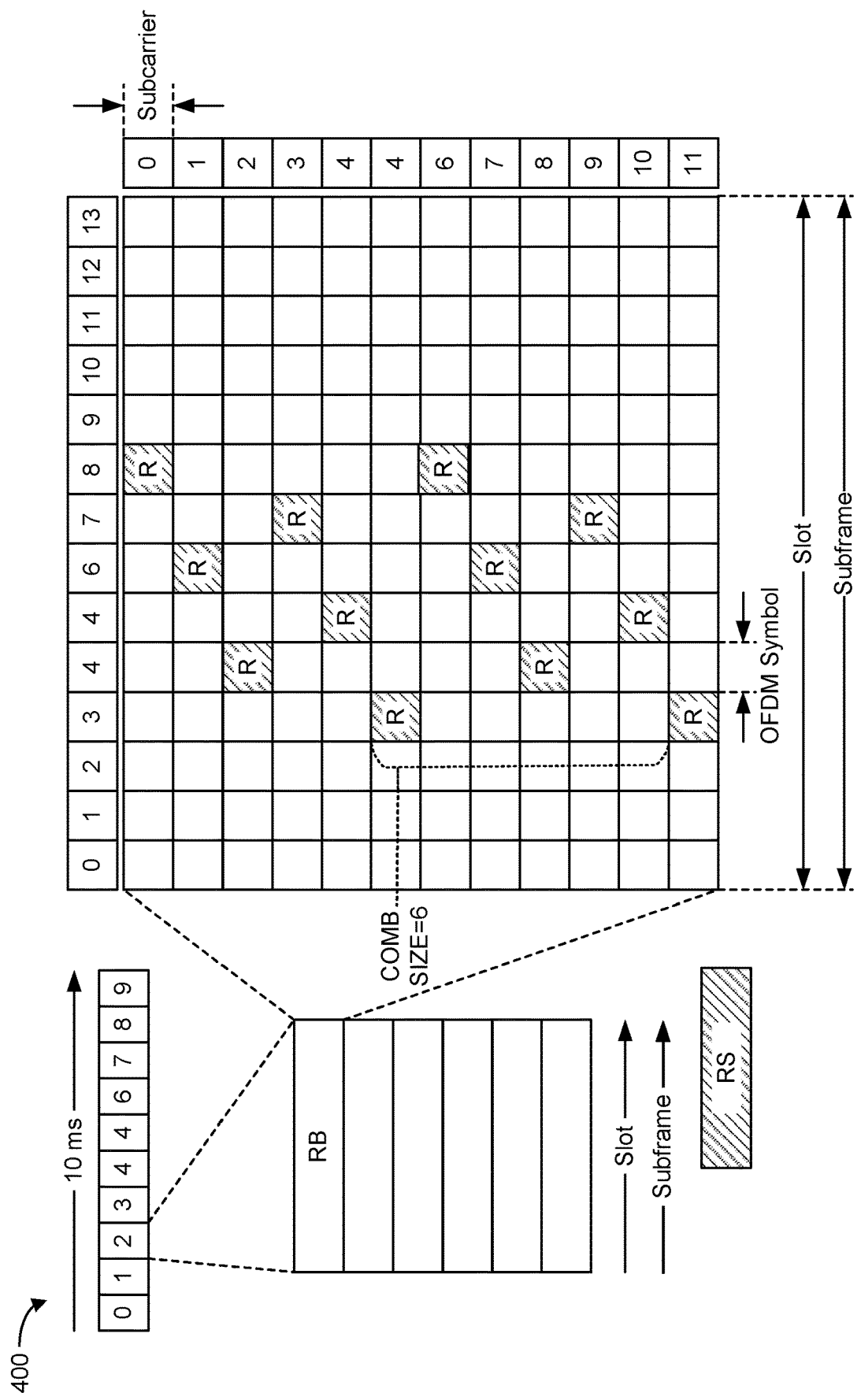
FIGS. 4A and 4B are diagrams illustrating example frame structures and channels within the frame structures, according to various aspects.

FIG. 4A is a diagram 400 illustrating an example of a downlink frame structure, according to aspects of the disclosure.

Figure 4B:
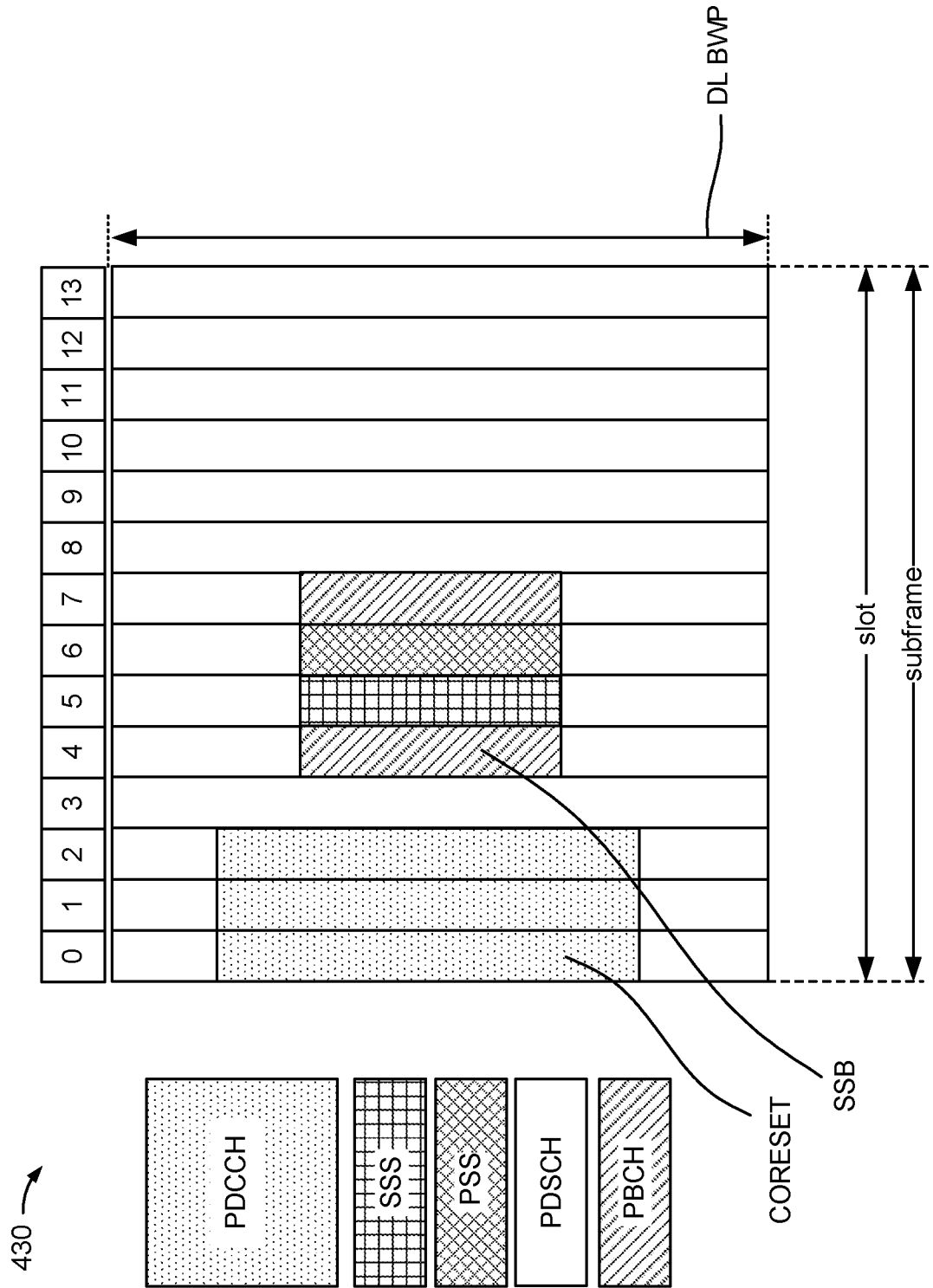

FIG. 4B is a diagram 430 illustrating an example of channels within the downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 504, 1024, or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (μ), for example, subcarrier spacing of 15 kHz, 30 kHz, 60 kHz, 120 kHz, and 240 kHz or greater may be available. Table 1 provided below lists some various parameters for different NR numerologies.

TABLE 1

| μ | SCS (kHz) | Symbols/ Slot | Slots/ Sub-frame | Slots/ Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4A and 4B, a numerology of 15 kHz is used. Thus, in the time domain, a 10 millisecond (ms) frame is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In NR, a subframe is 1 ms in duration, a slot is fourteen symbols in the time domain, and an RB contains twelve consecutive subcarriers in the frequency domain and fourteen consecutive symbols in the time domain. Thus, in NR there is one RB per slot. Depending on the SCS, an NR subframe may have fourteen symbols, twenty-eight symbols, or more, and thus may have 1 slot, 2 slots, or more. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates exemplary locations of REs carrying PRS (labeled "R").

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition."

A collection of resource elements (REs) that are used for transmission of PRS is referred to as a "PRS resource." The collection of resource elements can span multiple PRBs in the frequency domain and 'N' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fourth symbols of the PRS resource configuration, REs corresponding to every fourth subcarrier (e.g., subcarriers 0, 4, 8) are used to transmit PRS of the PRS resource. Currently, comb sizes of comb-2, comb-4, comb-6, and comb-12 are supported for DL PRS. FIG. 4A illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (e.g., PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^{\#}\cdot\{4, 5, 8, 10, 16, 20, 32, 40, 64, 80, 160, 320, 640, 1280, 2560, 5040, 10240\}$ slots, with μ=0, 1, 2, 3. The repetition factor may have a length selected from $\{1, 2, 4, 6, 8, 16, 32\}$ slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter ARFCN-ValueNR (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it could be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

Figure 5:
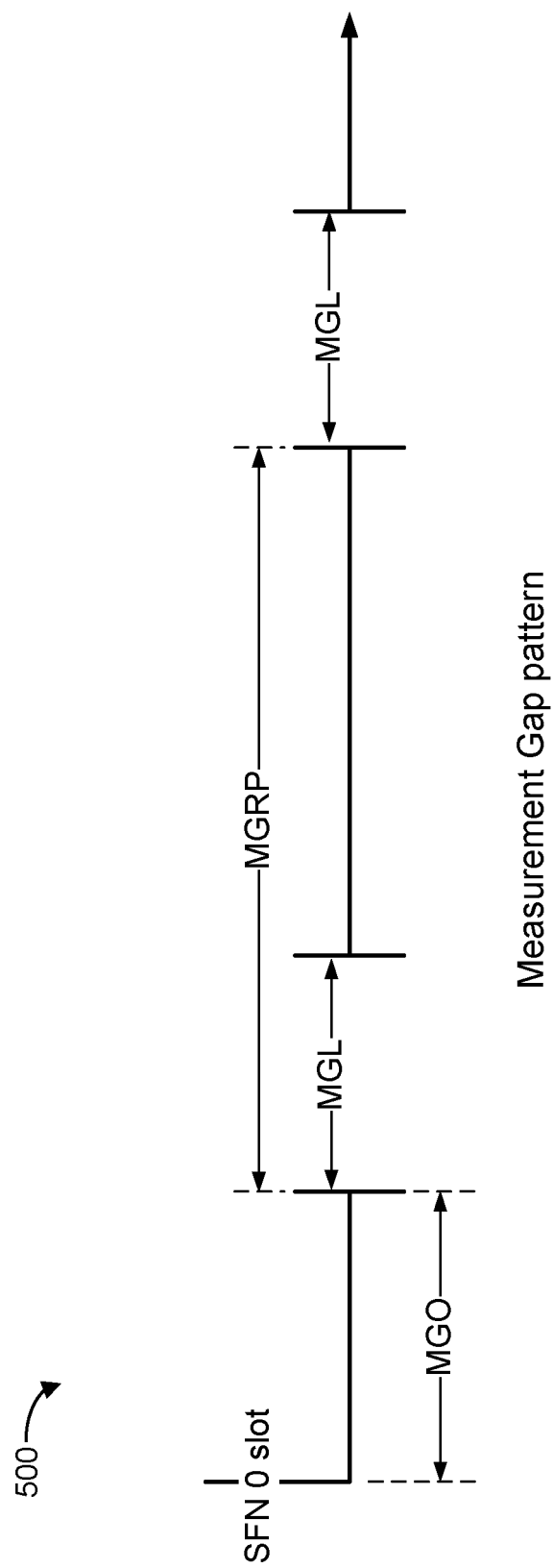
FIG. 5 is a diagram illustrating how the parameters of a measurement gap (MG) configuration specify a pattern of measurement gaps, according to various aspects.

FIG. 5 is a diagram 500 illustrating how the parameters of a measurement gap configuration specify a pattern of measurement gaps, according to aspects of the disclosure. The measurement gap repetition period (MGRP) defines the periodicity (in ms) at which the measurement gap repeats. It can have a value of 20, 40, 80, or 160 ms, although values of 320 and 640 ms are also being considered. The measurement gap length (MGL) is the length of the measurement gap in milliseconds. The measurement gap length can have a value of 1.5, 3, 3.5, 4, 5.5, or 6 ms, although values of 10, 18, 20, 34, 40, and 50 ms are also being considered. The measurement gap offset (MGO) is the offset of the start of the gap pattern from the start of a slot or subframe within the measurement gap repetition period (MGRP). There are currently about 160 offset values, but not all of the values are applicable for all periodicities. More specifically, the offset has a value in the range from '0' to one less than the MGRP. Thus, for example, if the MGRP is 20 ms, then the offset can range from '0' to '19.' Although not shown in FIG. 5, a measurement gap configuration may also include a measurement gap timing advance (MGTA) parameter. If configured, the MGTA indicates the amount of time before the occurrence of the slot or subframe in which the measurement gap is configured to begin. Currently, the MGTA can be 0.25 ms for FR2 or 0.5 ms for FR1. Measurement gaps are configured using the RRC protocol.

In Third Generation Partnership Project (3GPP) Release 16 (Rel-16), a UE is not expected to process DL PRS without configuration of a measurement gap (MG); UL DL PRS processing capability is defined for a single positioning frequency layer; and UE capability for simultaneous DL PRS processing across positioning frequency layers is not supported.

Figure 6:
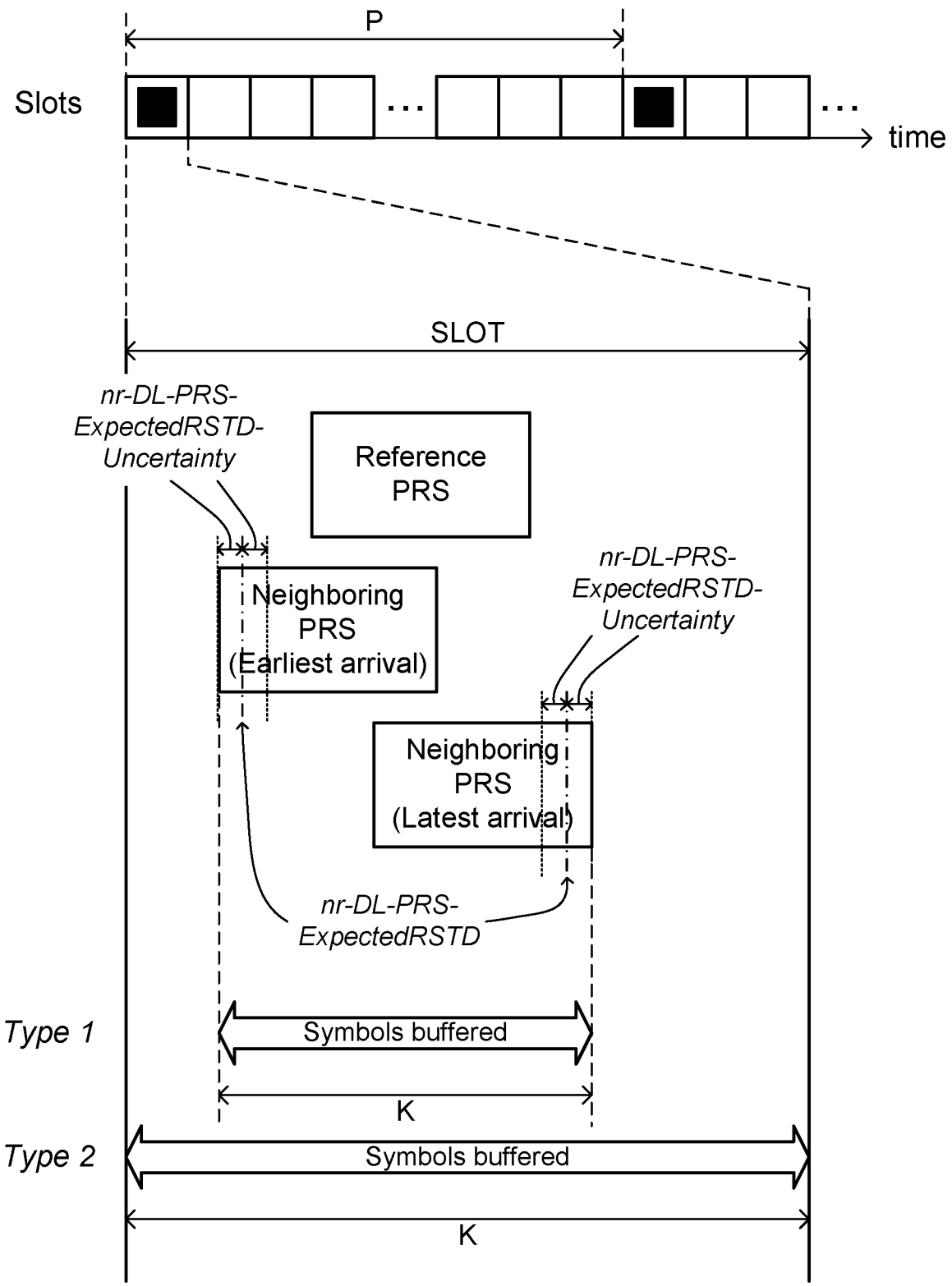
FIG. 6 illustrates some of the parameters associated with PRS measurements.

FIG. 6 illustrates some of the parameters associated with PRS measurements. FIG. 6 shows a number of slots in the time domain. A PRS measurement window period (P) defines how often the UE will perform a PRS measurement, i.e., the length of the period. Within each slot during which PRS measurements are made, there are two types of configurations that define how much of the slot that contains PRS transmissions a UE should buffer. A "Type 2" UE buffers an entire slot (i.e., the UE buffers all of the symbols within the slot), while a "Type 1" UE buffers only a defined portion of the slot (i.e., the UE buffers a subset of the symbols within the slot). The duration of the time that the UE buffers is referred to as the PRS symbol duration "K".

In Rel-16, for the purpose of DL processing capability, the duration K ms of DL PRS symbols within any P ms window is calculated for Type 2 UEs as $$K = \frac{1}{2^\mu}|S|,$$

where S is the set of slots of a serving cell within the P ms window in the positioning frequency layer that contains potential DL PRS resources considering the actual nr-DL-PRS-ExpectedRSTD, nr-DL-PRS-ExpectedRSTD-Uncertainty provided for each pair of DL PRS Resource Sets. Thus, for Type 2 UEs, the duration K may cover multiple slots. For Type 1 UEs, $[T_s^{start}, T_s^{end}]$ is the smallest interval in msec within slot s corresponding to an integer number of OFDM symbols of a serving cell $[T_s^{start}, T_s^{end}]$ that covers the union of the potential PRS symbols and determines the PRS symbol occupancy within slot s, where the interval considers the actual nr-DL-PRS-ExpectedRSTD, nr-DL-PRS-ExpectedRSTD-Uncertainty provided for each pair of DL PRS Resource Sets (target and reference). For Type 1 UEs, in other words, the value of K is equal to the length of time from the beginning of the earliest-arriving PRS to the end of the latest-arriving PRS within a specific slot.

The reference PRS indicates the expected location of the PRS in the time domain, but as shown in FIG. 6, the PRSs received from neighboring cells may arrive at a slightly different time. For New Radio (NR), the UE receives a higher layer parameter nr-DL-PRS-ExpectedRSTD, which indicates expected reference signal time difference (RSTD), i.e., the difference with respect to the received downlink (DL) subframe timing the UE is expected to receive a DL PRS, and nr-DL-PRS-ExpectedRSTD-uncertainty, which defines a search window around the ExpectedRSTD. FIG. 6 shows the earliest arriving neighboring PRS and the latest arriving neighboring PRS.

For Type 1 UEs, the value of K—and thus the number of symbols that should be buffered by the UE—is determined in part by this uncertainty. Thus, for both types of UEs, the parameters P and K directly affect how much time, resources, and power the UE will expend taking PRS measurements. The UE reports to the network the UE's DL processing capability for maximum bandwidth in MHz, such as the duration N (in ms) of PRS symbols that the UE can process every T ms, and the maximum number of PRS symbols that a UE can process in each slot. The network may respond by adjusting parameters, such as those described above. An example of a pertinent portion of the assistance data that may be provided to a UE is shown below:

```
NR-DL-PRS-AssistanceDataPerTRP-r16 ::= SEQUENCE {
    nr-DL-PRS-expectedRSTD-r16
        INTEGER (-3841 . . . 3841),
    nr-DL-PRS-expectedRSTD-uncerainty-r16
        INTEGER (-246 . . . 246),
    trp-ID-r16
        TRP-ID-r16 OPTIONAL,
    nr-DL-PRS-Config-r16
        NR-DL-PRS-Config-r16,
    . . .
}
```

Figure 7:
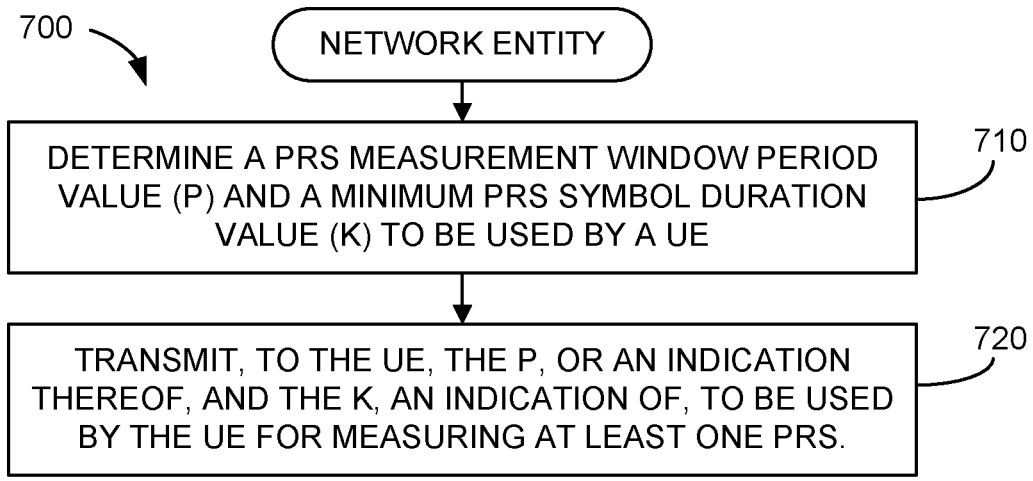
FIGS. 7 to 20 illustrate methods for wireless positioning according to aspects of the disclosure.

FIG. 7 is a flowchart of an example process 700 associated with PRS measurement window adaptation according to aspects of the disclosure. In some implementations, one or more process blocks of FIG. 7 may be performed by a network entity (e.g., an entity within the core network 170, a location server 172, etc.). In some aspects, the network entity comprises a location management function (LMF) or a location management server (LMS). In some implementations, one or more process blocks of FIG. 7 may be performed by another device or a group of devices separate from or including the network entity. Additionally, or alternatively, one or more process blocks of FIG. 7 may be performed by one or more components of network entity 306, such as processor(s) 394, memory 396, network transceiver(s) 390, and positioning component(s) 398, any or all of which may be means for performing the operations of process 700.

As shown in FIG. 7, process 700 may include determining a positioning reference signal (PRS) measurement window period value (P) and a minimum PRS symbol duration value (K) to be used by a user equipment (UE) (block 710). Means for performing the operation of block 710 may include the processor(s) 394, memory 396, or network transceiver(s) 390 of the network entity 306. For example, the network entity 306 may determine a P and K to be used by the UE, using the processor(s) 394, based on information received via the network transceiver(s) 390 or stored in memory 396. In some aspects, the UE comprises a Type 1 UE.

In some aspects, determining P comprises selecting P from a plurality of PRS measurement window periods supported by the UE. In some aspects, determining the P and the K comprises determining P, K, or both, based on a mobility status of the UE, a quality of a signal received by the UE, a necessity of the signal received by the UE, or both.

In some aspects, determining P, K, or both, based on the mobility status of the UE comprises determining P based on a position of the UE. In some aspects, determining P based on the position of the UE comprises selecting a larger value for P if the position of the UE is known with a certainty greater than a first threshold and selecting a smaller value for P if the position of the UE is known with a certainly less than a second threshold.

In some aspects, determining P based on the mobility status of the UE comprises determining P based on a velocity of the UE. In some aspects, determining P based on the velocity of the UE comprises selecting a smaller value for P if the velocity of the UE is greater than a first threshold and selecting a larger value for P if the velocity of the UE is less than a second threshold.

In some aspects, determining P, K, or both, based on the quality of the signal received by the UE comprises determining P, K, or both, based on the quality of a reference signal received power (RSRP), a reference signal received quality (RSRQ), a signal to interference plus noise ratio (SINR), or combinations thereof. In some aspects, determining P, K, or both, based on the quality of the signal received by the UE comprises selecting a larger value for P if the quality of the signal received by the UE is greater than a first threshold and selecting a smaller value for P if the quality of the signal received by the UE is less than a second threshold.

As further shown in FIG. 7, process 700 may include transmitting, to the UE, the P, or an indication thereof, and the K, or an indication thereof, to be used by the UE for measuring at least one PRS (block 720). Means for performing the operation of block 720 may include the network transceiver(s) 390 of the network entity 306. For example, the network entity 306 may use the network transceiver(s) 390 to transmit the values of the P and the K to be used by the UE for measuring at least one PRS, or the network entity 306 may transmit an index number into a table of values of P or K, or other indicator of a value of P or K, rather than transmitting the value itself. In some aspects, transmitting the indication of the P and the K to be used by the UE comprises sending the indication via a medium access control (MAC) control element (CE), downlink control information (DCI), or combinations thereof. In some aspects, process 700 includes receiving, from the UE, a confirmation of a value of P, a value of K, or both, that the UE is using for PRS measurements.

In some aspects, process 700 includes, prior to transmitting the indication of the P and the K to be used by the UE, receiving, from the UE, information that specifies a plurality of PRS measurement window periods supported by the UE, and wherein determining P comprises selecting one of the plurality of PRS measurement window periods supported by the UE. In some aspects, receiving the information that specifies the plurality of PRS measurement window periods supported by the UE further comprises receiving an indication of which one or more of the plurality of PRS measurement window periods supported by the UE is preferred by the UE.

In some aspects, process 700 includes receiving, from the UE, a plurality of PRS measurements, the plurality of PRS measurements comprising a measurement of a reference PRS transmitted by a serving cell of the UE and at least one measurement of a PRS transmitted by a neighboring cell of the serving cell, identifying, from the plurality of PRS measurements, an earliest PRS that satisfies a measurement quality threshold and a latest PRS that satisfies the measurement quality threshold, determining a value of K that provides a PRS symbol duration sufficient to contain the earliest PRS that satisfies the measurement quality threshold and the latest PRS that satisfies the measurement quality threshold, and transmitting, to the UE, the value of K. In some aspects, the measurement quality threshold comprises a threshold value for a reference signal received power (RSRP), a reference signal received quality (RSRQ), a signal to interference plus noise ratio (SINR), or combinations thereof. In some aspects, determining the value of K that provides a PRS symbol duration sufficient to contain the earliest PRS that satisfies the measurement quality threshold and the latest PRS that satisfies the measurement quality threshold comprises determining a slot timing that extends from a beginning of the earliest PRS that satisfies the measurement quality threshold to an end of the latest PRS that satisfies the measurement quality threshold. In some aspects, process 700 includes receiving, from the UE, a confirmation of the value of K that will be used by the UE.

In some aspects, process 700 includes determining a change of an uncertainty associated with a PRS transmitted by a neighboring cell of a serving cell of the UE, and notifying the UE of the change of the uncertainty. In some aspects, determining the change of the uncertainty associated with a PRS transmitted by a neighboring cell of the serving cell of the UE comprises determining the change of the uncertainty based on a certainty of a position of the UE. In some aspects, the uncertainty associated with a PRS transmitted by a neighboring cell decreases as the certainty of the position of the UE increases and increases as the certainty of the position of the UE decreases. In some aspects, notifying the UE of the change of the uncertainty comprises sending the UE an updated value for a nr-DL-PRS-ExpectedRSTD-Uncertainty parameter associated with the PRS transmitted by the neighboring cell.

Process 700 may include additional implementations, such as any single implementation or any combination of implementations described below and/or in connection with one or more other processes described elsewhere herein. Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
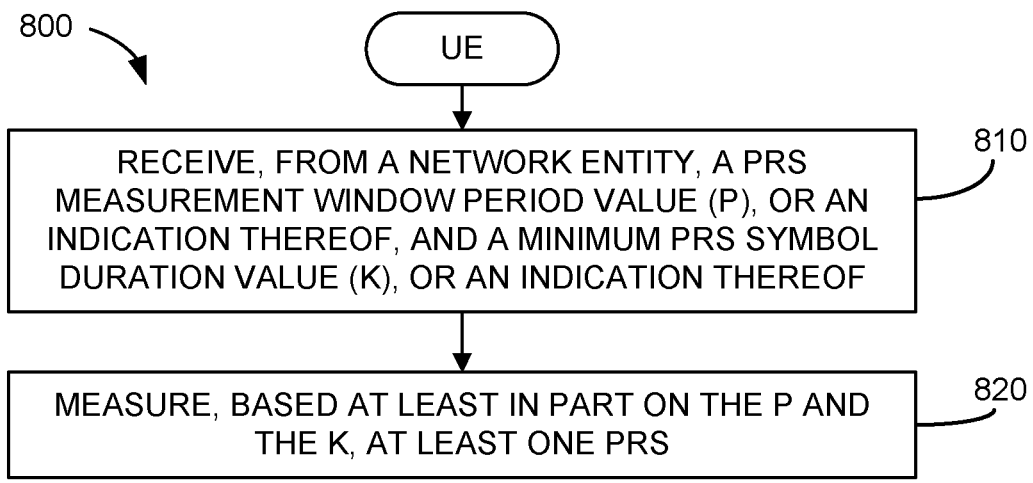

FIG. 8 is a flowchart of an example process 800 associated with PRS measurement window adaptation according to aspects of the disclosure. In some implementations, one or more process blocks of FIG. 8 may be performed by a UE (e.g., UE 104). In some implementations, one or more process blocks of FIG. 8 may be performed by another device or group of devices separate from or including the UE. Additionally, or alternatively, one or more process blocks of FIG. 8 may be performed by one or more components of UE 302, such as processor(s) 332, memory 340, WWAN transceiver(s) 310, short-range wireless transceiver(s) 320, satellite signal receiver 330, sensor(s) 344, user interface 346, and positioning component(s) 342, any or all of which may be means for performing the operations of process 800. In some aspects, the UE comprises a Type 1 UE or a Type 2 UE.

As shown in FIG. 8, process 800 may include receiving, from a network entity, an indication of a PRS measurement window period value (P) and a minimum PRS symbol duration value (K) (block 810). Means for performing the operation of block 810 may include the WWAN transceiver(s) 310 of the UE 302. For example, the UE 302 may receive the indication of P and K via the receiver(s) 312. In some aspects, the network entity comprises a location management function (LMF) or a location management server (LMS).

In some aspects, receiving the indication of the P and the K comprises receiving the indication of the P and the K via a medium access control (MAC) control element (CE), downlink control information (DCI), or combinations thereof. In some aspects, process 800 includes prior to receiving the indication of the P and the K, sending, to the network entity, information that specifies a plurality of PRS measurement window periods supported by the UE. In some aspects, sending the information that specifies the plurality of PRS measurement window periods supported by the UE further comprises sending an indication of which one or more of the plurality of PRS measurement window periods supported by the UE is preferred by the UE.

As further shown in FIG. 8, process 800 may include measuring, based at least in part on the P and the K, at least one PRS (block 820). Means for performing the operation of block 820 may include the processor(s) 332, memory 340, and the WWAN transceiver(s) 310 of the UE 302. For example, the receiver(s) 312 of UE 302 may use the P and the K when measuring at least one PRS. In some aspects, process 800 includes sending, to the network entity, a confirmation that the UE is using the P and the K for measuring at least one PRS.

In some aspects, process 800 includes receiving, from the network entity, an instruction to modify a value of P being used by the UE, a value of K being used by the UE, or both, and modifying the value of P, the value of K, or both, according to the instruction. In some aspects, process 800 includes sending, to the network entity, a confirmation that the value of P was modified, that the value of K was modified, or both. In some aspects, receiving the instruction to modify the value of P being used by the UE, the value of K being used by the UE, or both comprises receiving the instruction via a medium access control (MAC) control element (CE), downlink control information (DCI), or combinations thereof.

In some aspects, process 800 includes performing a plurality of PRS measurements, the plurality of PRS measurements comprising a measurement of a reference PRS transmitted by a serving cell of the UE and at least one measurement of a PRS transmitted by a neighboring cell of the serving cell, identifying, from the plurality of PRS measurements, an earliest PRS that satisfies a measurement quality threshold and a latest PRS that satisfies the measurement quality threshold, determining a value of K that provides a PRS symbol duration sufficient to contain the earliest PRS that satisfies the measurement quality threshold and latest PRS that satisfies the measurement quality threshold, and transmitting, to a network node, the value of K. In some aspects, the measurement quality threshold comprises a threshold value for a reference signal received power (RSRP), a reference signal received quality (RSRQ), a signal to interference plus noise ratio (SINR), or combinations thereof. In some aspects, determining a value of K that provides a PRS symbol duration sufficient to contain the earliest PRS that satisfies the measurement quality threshold and the latest PRS that satisfies the measurement quality threshold comprises determining a slot timing that extends from a beginning of the earliest PRS that satisfies the measurement quality threshold to an end of the latest PRS that satisfies the measurement quality threshold. In some aspects, process 800 includes receiving, from the network node, an indication to use the value of K. In some aspects, process 800 includes sending, to the network node, a confirmation that the value of K will be used.

In some aspects, process 800 includes receiving, from the network entity, a notification of a change of an uncertainty associated with a PRS transmitted by a neighboring cell of a serving cell of the UE, and modifying a value of K based on the notification. In some aspects, process 800 includes sending, to the network entity, an indication of that the value of K was modified. In some aspects, receiving the notification of the change of the uncertainty comprises receiving an updated value for a nr-DL-PRS-ExpectedRSTD-Uncertainty parameter associated with the PRS transmitted by the neighboring cell.

Process 800 may include additional implementations, such as any single implementation or any combination of implementations described below and/or in connection with one or more other processes described elsewhere herein. Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
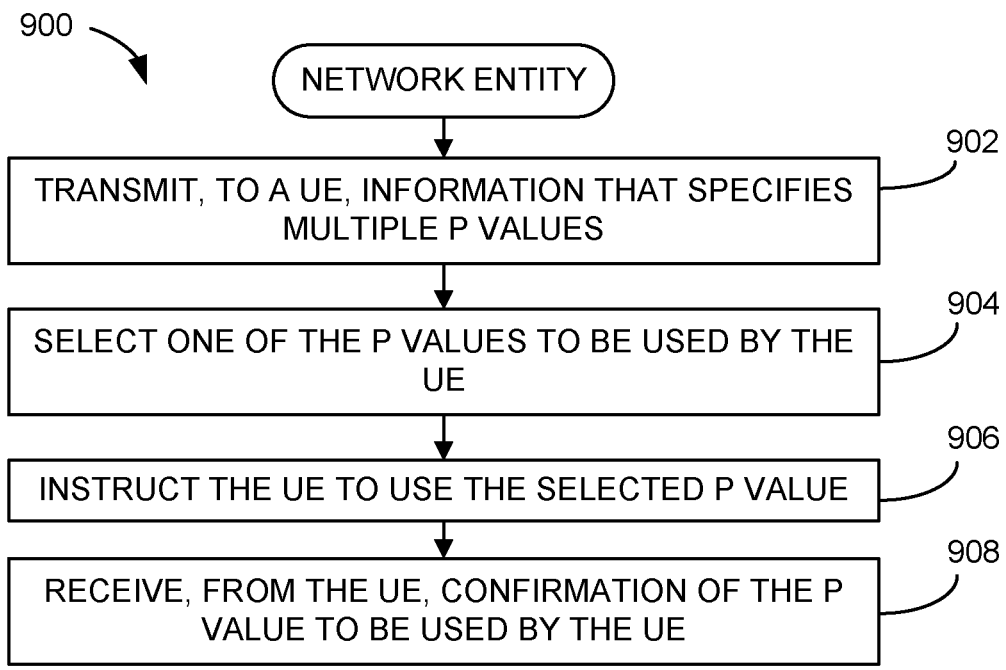

FIG. 9 illustrates a method 900 for wireless communication according to aspects of the disclosure. In an aspect, method 900 may be performed by a network entity, such as an LMS/LMF or other network entity. In FIG. 9, the method includes: at 902, transmitting, to a UE, information that specifies two or more PRS measurement window period (P) values; at 904, selecting one of the P values to be used by the UE; and, at 906, instructing the UE to use the selected P value. The method may include, at 908, receiving, from the UE, a confirmation of the P value to be used by the UE.

Implementations may include one or more of the following features. The network entity may include a location management function (LMF) or a location management server (LMS). Transmitting the information that specifies two or more P values may include broadcasting the information to two or more UEs. Selecting one of the P values may include selecting a P value based on a mobility status of the UE and/or a quality of a signal received by the UE. A mobility status of the UE may include a position of the UE. Selecting one of the P values may include selecting a larger value for P if the position of the UE is known with a certainty greater than a first threshold and selecting a smaller value for P if the position of the UE is known with a certainly less than a second threshold. A mobility status of the UE may include a velocity of the UE. Selecting one of the P values may include selecting a smaller value for P if the velocity of the UE is greater than a first threshold and selecting a larger value for P if the velocity of the UE is less than a second threshold. A quality of a signal received by the UE may include a reference signal received power (RSRP), a reference signal received quality (RSRQ), and/or a signal to interference plus noise ratio (SINR). Selecting one of the P values may include selecting a larger value for P if the quality of a signal received by the UE is greater than a first threshold and selecting a smaller value for P if the quality of a signal received by the UE is less than a second threshold. Instructing the UE to use the selected P value may include sending, to the UE, an indication of the selected P value. Sending an indication of the selected P value may include sending the indication via a medium access control (MAC) control element (CE) and/or downlink control information (DCI). The UE may include a type 1 UE or a type 2 UE.

Figure 10:
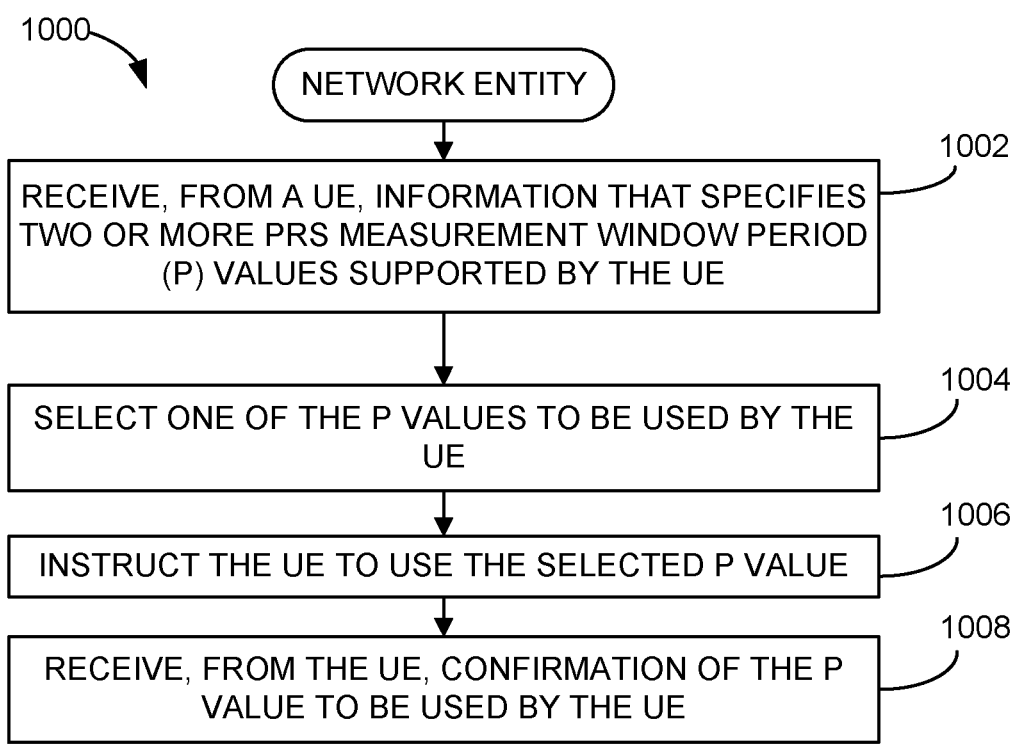

FIG. 10 illustrates a method 1000 for wireless communication according to aspects of the disclosure. In an aspect, method 1000 may be performed by a network entity, such as an LMS/LMF or other network entity. In FIG. 10, the method includes: at 1002, receiving, from a user equipment (UE), information that specifies two or more positioning reference signal (PRS) measurement window period (P) values supported by the UE; at 1004, selecting one of the P values to be used by the UE, and at 1006, instructing the UE to use the selected P value. The method may include, at 1008, receiving, from the UE, a confirmation of the P value to be used by the UE.

Various aspects may include one or more of the following features. The network entity may include a location management function (LMF) or a location management server (LMS). Receiving the information that specifies two or more P values may include receiving an indication of which one or more of the P values is preferred by the UE. Selecting one of the P values may include selecting a P value based on a mobility status of the UE and/or a quality of a signal received by the UE. A mobility status of the UE may include a position of the UE. Selecting one of the P values may include selecting a larger value for P if the position of the UE is known with a certainty greater than a first threshold and selecting a smaller value for P if the position of the UE is known with a certainly less than a second threshold. A mobility status of the UE may include a velocity of the UE. Selecting one of the P values may include selecting a smaller value for P if the velocity of the UE is greater than a first threshold and selecting a larger value for P if the velocity of the UE is less than a second threshold. A quality of a signal received by the UE may include a reference signal received power (RSRP), a reference signal received quality (RSRQ), and/or a signal to interference plus noise ratio (SINR). Selecting one of the P values may include selecting a larger value for P if the quality of a signal received by the UE is greater than a first threshold and selecting a smaller value for P if the quality of a signal received by the UE is less than a second threshold. Instructing the UE to use the selected P value may include sending, to the UE, an indication of the selected P value. Sending an indication of the selected P value may include sending the indication via a medium access control (MAC) control element (CE) and/or downlink control information (DCI). The UE may include a type 1 UE or a type 2 UE.

Figure 11:
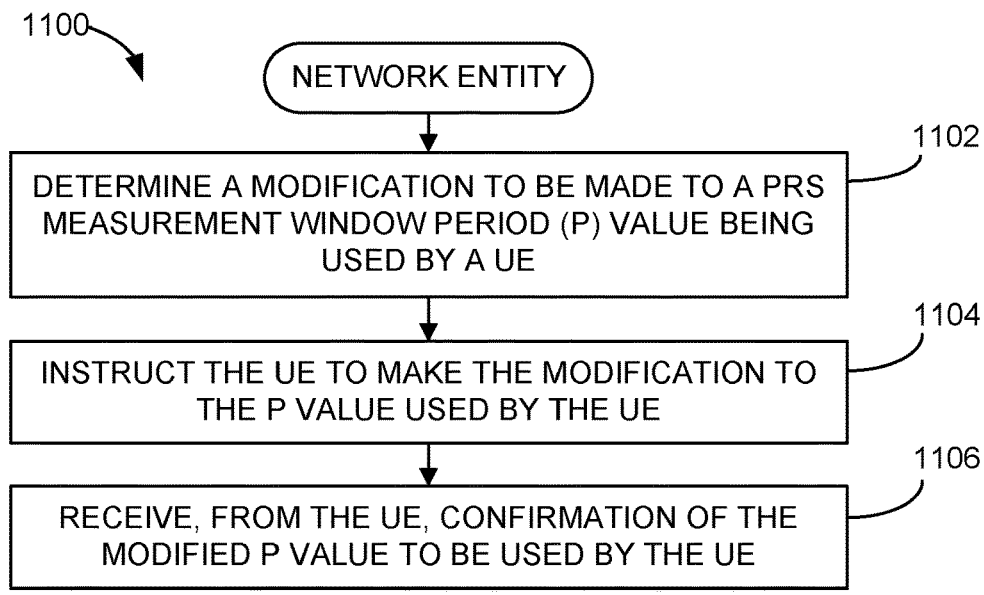

FIG. 11 illustrates a method 1100 for wireless communication according to aspects of the disclosure. In an aspect, method 1100 may be performed by a network entity, such as an LMS/LMF or other network entity. In FIG. 11, the method includes: at 1102, determining a modification to be made to a positioning reference signal (PRS) measurement window period (P) value for a user equipment (UE); and at 1104, instructing the UE to make the modification to the P value. The method may include, at 1106, receiving, from the UE, a confirmation of the modified P value to be used by the UE.

Various aspects may include one or more of the following features. The network entity may include a location management function (LMF) or a location management server (LMS). Determining a modification to be made to a P value may include determining a modification to be made based on a mobility status of the UE and/or a quality of a signal received by the UE. A mobility status of the UE may include a position of the UE. The modification to be made may include increasing the value of P if the position of the UE is known with a certainty greater than a first threshold and decreasing the value for P if the position of the UE is known with a certainly less than a second threshold. A mobility status of the UE may include a velocity of the UE. The modification to be made may include decreasing the value of P if the velocity of the UE is greater than a first threshold and increasing the value of P if the velocity of the UE is less than a second threshold. A quality of a signal received by the UE may include a reference signal received power (RSRP), a reference signal received quality (RSRQ), and/or a signal to interference plus noise ratio (SINR). The modification to be made may include increasing the value of P if the quality of a signal received by the UE is greater than a first threshold and decreasing the value of P if the quality of a signal received by the UE is less than a second threshold. Instructing the UE to use the selected P value may include sending, to the UE, an indication of the selected P value. Sending an indication of the selected P value may include sending the indication via a medium access control (MAC) control element (CE) and/or downlink control information (DCI). The UE may include a type 1 UE or a type 2 UE. In some aspects, this mechanism provides a closed-loop control over PRS measurement period. For example, when the UE's position is changing more rapidly, the UE is instructed to reduce its measurement period (i.e., to take PRS measurements more often), but if the UE's position is changing less rapidly, the UE is instructed to increase its measurement period (i.e., to take PRS measurements less often).

Figure 12:
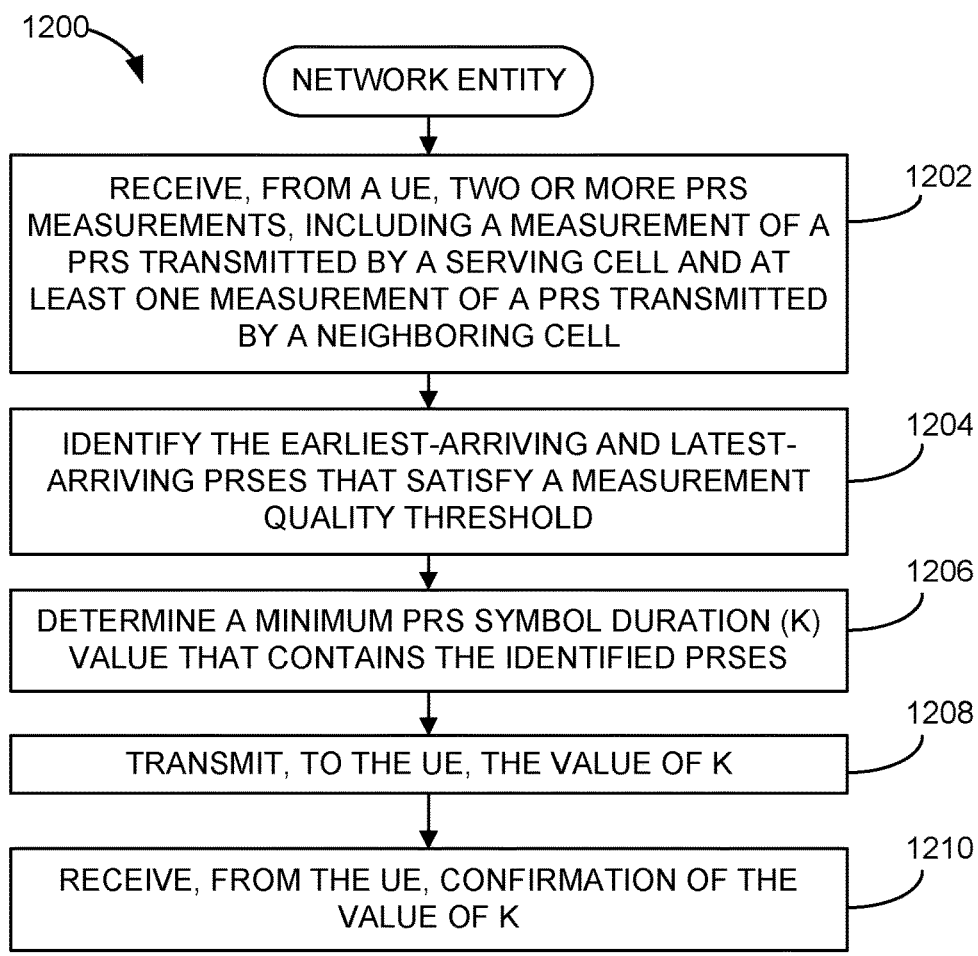

FIG. 12 illustrates a method 1200 for wireless communication according to aspects of the disclosure. In an aspect, method 1200 may be performed by a network entity, such as an LMS/LMF or other network entity. In FIG. 12, the method includes: at 1202, receiving, from a user equipment (UE), two or more positioning reference signal (PRS) measurements, the measurements including a measurement of a reference PRS transmitted by a serving cell of the UE and at least one measurement of a PRS transmitted by a neighboring cell of the serving cell; at 1204, identifying, from the PRS measurements, an earliest PRS that satisfies a measurement quality threshold and a latest PRS that satisfies the measurement quality threshold; at 1206, determining a minimum PRS symbol duration (K) value that contains the identified earliest PRS that satisfies a measurement quality threshold and latest PRS that satisfies the measurement quality threshold; and at 1208, transmitting, to the UE, the value of K. The method may include, at 1210, receiving, from the UE, a confirmation of the K value to be used by the UE. In this manner, the network node may discard PRS measurements with low quality, e.g., those having a RSRP, RSRP, or SINR below some threshold. The remaining (non-discarded) PRS measurements may occupy a narrow window of time than the is occupied by the full set of PRS measurements, in which the UE may be able to reduce the value of K and thus save power.

Various aspects may include one or more of the following features. The network entity may include a location management function (LMF) or a location management server (LMS). The measurement quality threshold may include a threshold value for a reference signal received power (RSRP), a reference signal received quality (RSRQ), and/or a signal to interference plus noise ratio (SINR). Determining a minimum PRS symbol duration (K) value that contains the identified earliest PRS latest PRS that satisfy the measurement quality threshold may include determining a slot timing that extends from the beginning of the identified earliest PRS that satisfies the threshold to the end of the identified latest PRS that satisfies the threshold. The UE may include a type 1 UE.

Figure 13:
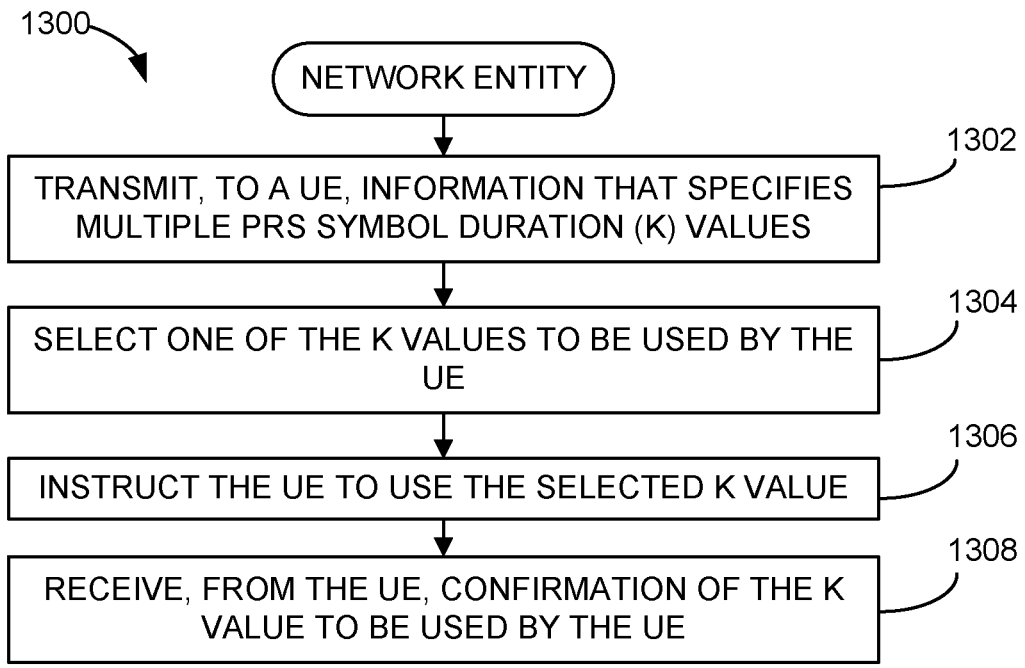

FIG. 13 illustrates a method 1300 for wireless communication according to aspects of the disclosure. In an aspect, method 1300 may be performed by a network entity, such as an LMS/LMF or other network entity. In FIG. 13, the method includes: at 1302, transmitting, to a user equipment (UE), information that specifies two or more positioning reference signal (PRS) symbol duration (K) values; at 1304, selecting one of the K values to be used by the UE, and at 1306, instructing the UE to use the selected K value. The method may include, at 1308, receiving, from the UE, a confirmation of the K value to be used by the UE.

Various aspects may include one or more of the following features. The network entity may include a location management function (LMF) or a location management server (LMS). Transmitting the information that specifies two or more K values may include broadcasting the information to two or more UEs. Selecting one of the K values may include selecting a K value based on a quality of a signal received by the UE and/or a necessity of a signal received by the UE. For example, a signal may not be necessary if it provides information that substantially duplicates information provided by another signal or if it provides information that provides little additional to no information to information provided by other signals. A quality of a signal received by the UE may include a reference signal received power (RSRP), a reference signal received quality (RSRQ), and/or a signal to interference plus noise ratio (SINR). Instructing the UE to use the selected K value may include sending, to the UE, an indication of the selected K value. Sending an indication of the selected K value may include sending the indication via a medium access control (MAC) control element (CE) and/or downlink control information (DCI). The UE may include a type 1 UE.

Figure 14:
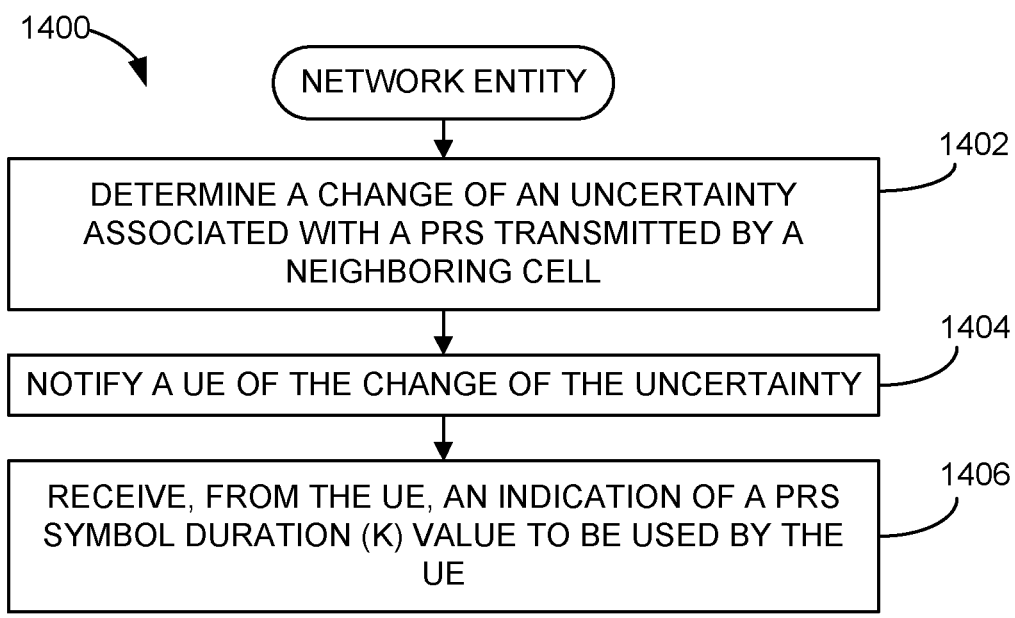

FIG. 14 illustrates a method 1400 for wireless communication according to aspects of the disclosure. In an aspect, method 1400 may be performed by a network entity, such as an LMS/LMF or other network entity. In FIG. 14, the method includes: at 1402, determining a change of an uncertainty associated with a positioning reference signal (PRS) transmitted by a neighboring cell of the serving cell; and, at 1404, notifying a user equipment (UE) of the change of the uncertainty. The method may include, at 1406, receiving, from the UE, an indication of a PRS symbol duration (K) to be used by the UE.

Various aspects may include one or more of the following features. The network entity may include a location management function (LMF) or a location management server (LMS). Determining the change of uncertainty associated with a PRS transmitted by a neighboring cell of the serving cell may include determining the change of uncertainty based on a certainty of a position of the UE. The uncertainty associated with a PRS transmitted by a neighboring cell decreases as the certainty of the position of the UE increases and increases as the certainty of the position of the UE decreases. Notifying the UE of the change of the uncertainty may include sending the UE an updated value for a nr-DL-PRS-ExpectedRSTD-uncertainty parameter associated with the PRS transmitted by the neighboring cell. The UE may include a type 1 UE.

Figure 15:
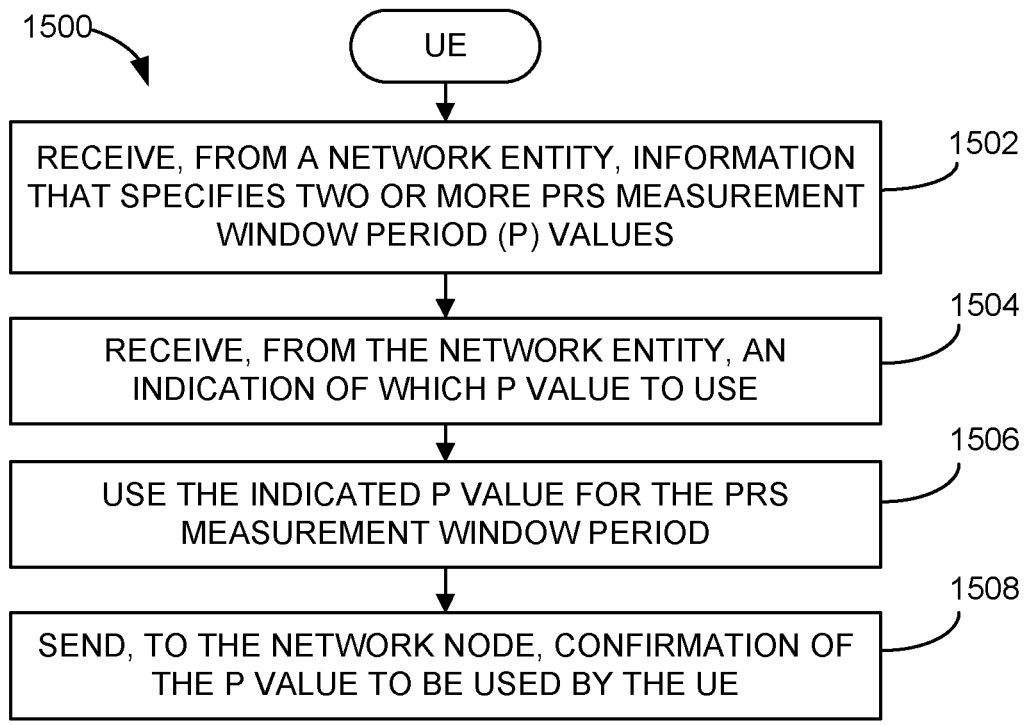

FIG. 15 illustrates a method 1500 for wireless communication according to aspects of the disclosure. In an aspect, method 1500 may be performed by a UE. In FIG. 15, the method includes: at 1502, receiving, from a network entity, information that specifies two or more positioning reference signal (PRS) measurement window period (P) values; at 1504, receiving, from the network entity, an indication of one of the P values to use; and at 1506, using the indicated P value for the PRS measurement window period. The method may include, at 1508, sending, to the network entity, a confirmation of the P value to be used by the UE.

Various aspects may include one or more of the following features. The network entity may include a location management function (LMF) or a location management server (LMS). Receiving the indication of the selected P value may include receiving the indication via a medium access control (MAC) control element (CE) and/or downlink control information (DCI). The UE may include a type 1 UE or a type 2 UE.

Figure 16:
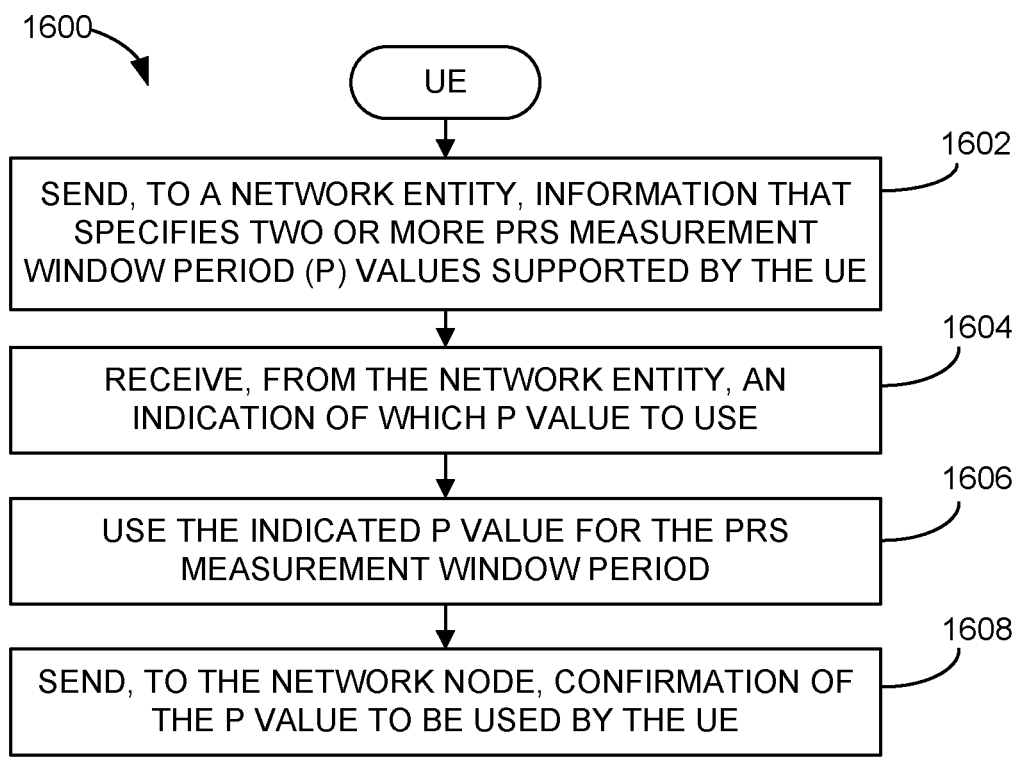

FIG. 16 illustrates a method 1600 for wireless communication according to aspects of the disclosure. In an aspect, method 1600 may be performed by a UE. In FIG. 16, the method includes: at 1602, sending, to a network entity, information that specifies two or more positioning reference signal (PRS) measurement window period (P) values supported by the UE; at 1604, receiving, from the network entity, an indication of which of the P values to use; and at 1606, using the indicated P value as the PRS measurement window period. The method may include, at 1608, sending, to the network entity, a confirmation of the P value to be used by the UE.

Various aspects may include one or more of the following features. Sending the information that specifies two or more P values may include sending an indication of which one or more of the P values is preferred by the UE. The network entity may include a location management function (LMF) or a location management server (LMS). Receiving an indication of the selected P value may include receiving the indication via a medium access control (MAC) control element (CE) and/or downlink control information (DCI). The UE may include a type 1 UE or a type 2 UE.

Figure 17:
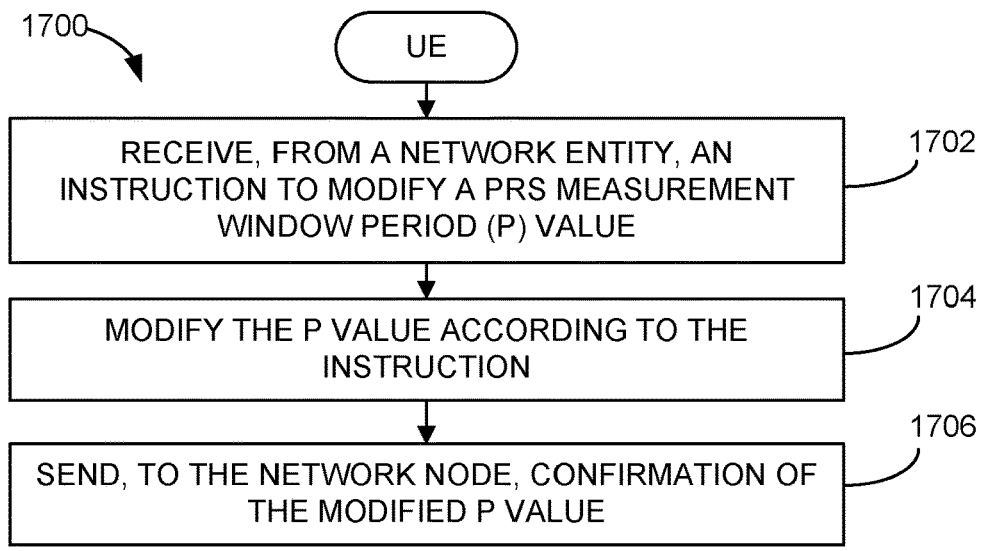

FIG. 17 illustrates a method 1700 for wireless communication according to aspects of the disclosure. In an aspect, method 1700 may be performed by a UE. In FIG. 17, the method includes: at 1702, receiving, from a network entity, an instruction to modify a positioning reference signal (PRS) measurement window period (P) value; and at 1704, modifying the P value according to the instruction. The method may include, at 1706, sending, to the network entity, a confirmation of the modified P value.

Various aspects may include one or more of the following features. The network entity may include a location management function (LMF) or a location management server (LMS). Receiving the instruction to modify a P value may include receiving the instruction via a medium access control (MAC) control element (CE) and/or downlink control information (DCI). The UE may include a type 1 UE or a type 2 UE.

Figure 18:
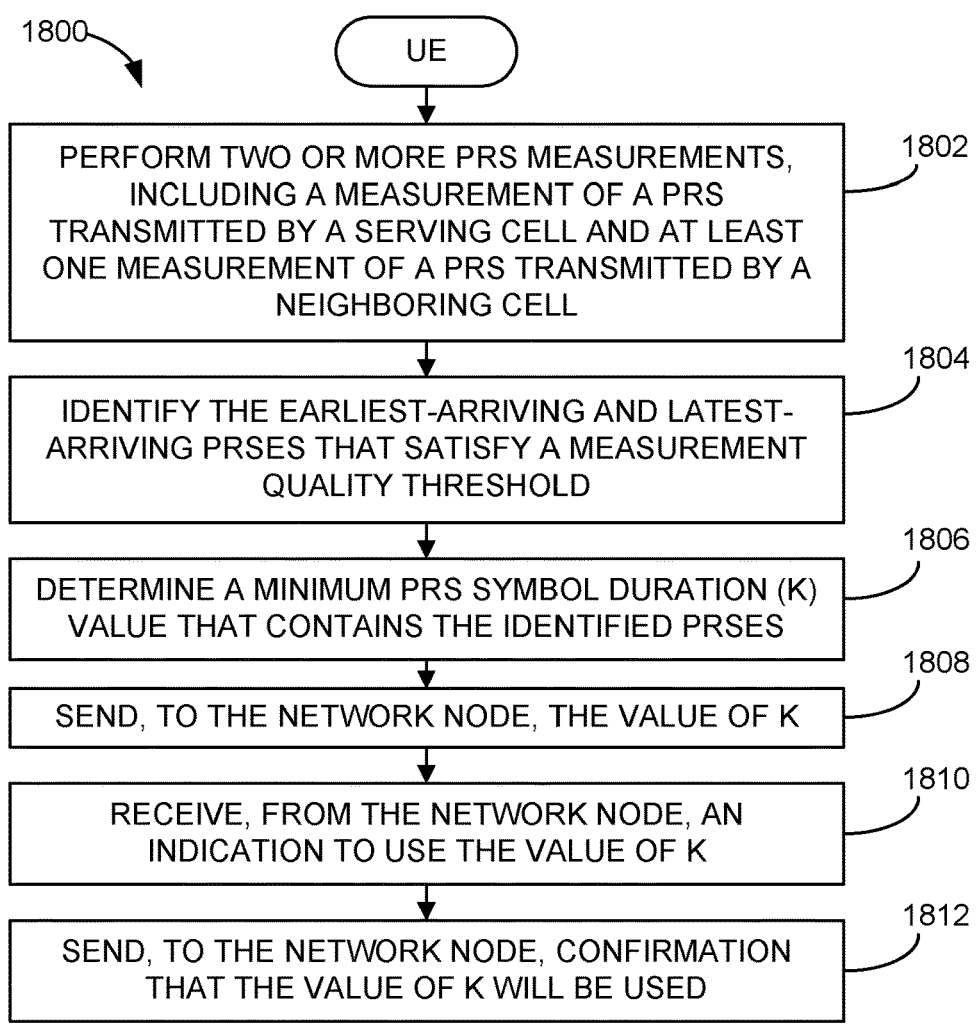

FIG. 18 illustrates a method 1800 for wireless communication according to aspects of the disclosure. In an aspect, method 1800 may be performed by a UE. In FIG. 18, the method includes: at 1802, performing two or more positioning reference signal (PRS) measurements, including a measurement of a reference PRS transmitted by a serving cell of the UE and at least one measurement of a PRS transmitted by a neighboring cell of the serving cell; at 1804, identifying, from the PRS measurements, an earliest PRS that satisfies a measurement quality threshold and a latest PRS that satisfies the measurement quality threshold; at 1806, determining a minimum PRS symbol duration (K) value that contains the identified earliest PRS that satisfies a measurement quality threshold and latest PRS that satisfies the measurement quality threshold; and at 1808, transmitting, to a network node, the value of K. The method may include, at 1810, receiving, from the network node, an indication to use the value of K. The method may include, at 1812, sending, to the network node, a confirmation that the value of K will be used.

Various aspects may include one or more of the following features. The network entity may include a location management function (LMF) or a location management server (LMS). The measurement quality threshold may include a threshold value for a reference signal received power (RSRP), a reference signal received quality (RSRQ), and/or a signal to interference plus noise ratio (SINR). Determining a minimum PRS symbol duration (K) value that contains the identified earliest PRS latest PRS that satisfy the measurement quality threshold may include determining a slot timing that extends from the beginning of the identified earliest PRS that satisfies the threshold to the end of the identified latest PRS that satisfies the threshold. The UE may include a type 1 UE. In this manner, a UE may discard PRS measurements with low quality, e.g., those having a RSRP, RSRP, or SINR below some threshold. The remaining (non-discarded) PRS measurements may occupy a narrow window of time than the is occupied by the full set of PRS measurements, in which the UE may be able to reduce the value of K and thus save power.

Figure 19:
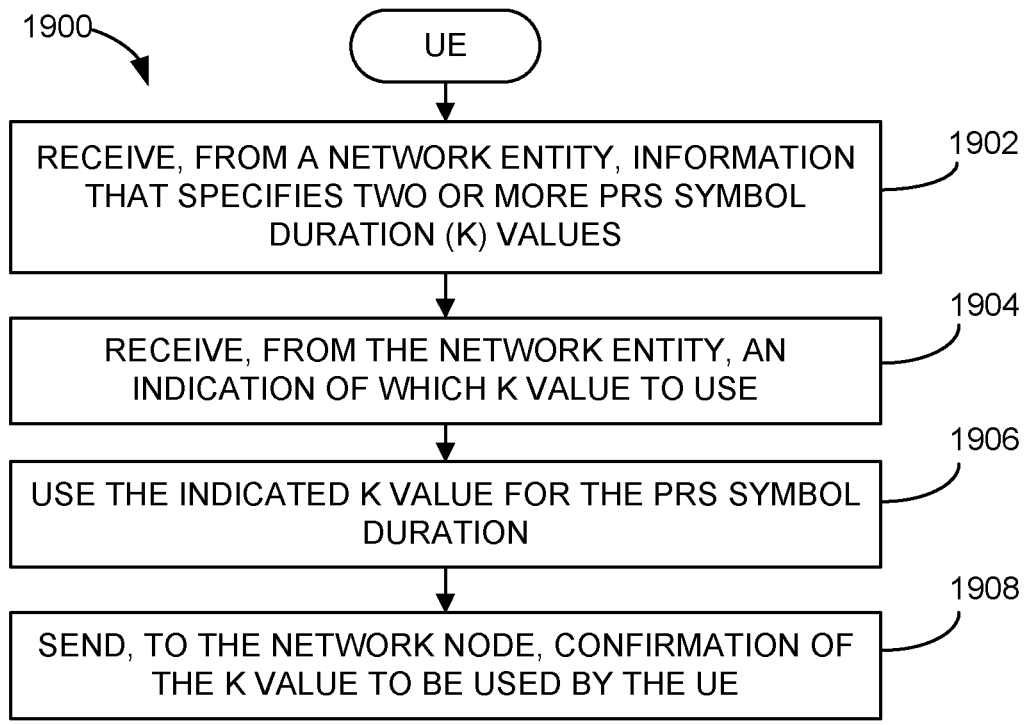

FIG. 19 illustrates a method 1900 for wireless communication according to aspects of the disclosure. In an aspect, method 1900 may be performed by a UE. In FIG. 19, the method includes: at 1902, receiving, from a network entity, information that specifies two or more positioning reference signal (PRS) symbol duration (K) values; at 1904, receiving, from the network entity, an indication of one of the K values to use; and at 1906, using the indicated K value for the PRS symbol duration. The method may include, at 1908, sending, to the network entity, a confirmation of the K value to be used by the UE.

Various aspects may include one or more of the following features. The network entity may include a location management function (LMF) or a location management server (LMS). Receiving, from the network entity, an indication of one of the K values to use may include receiving the indication via a medium access control (MAC) control element (CE) and/or downlink control information (DCI). The UE may include a type 1 UE.

Figure 20:
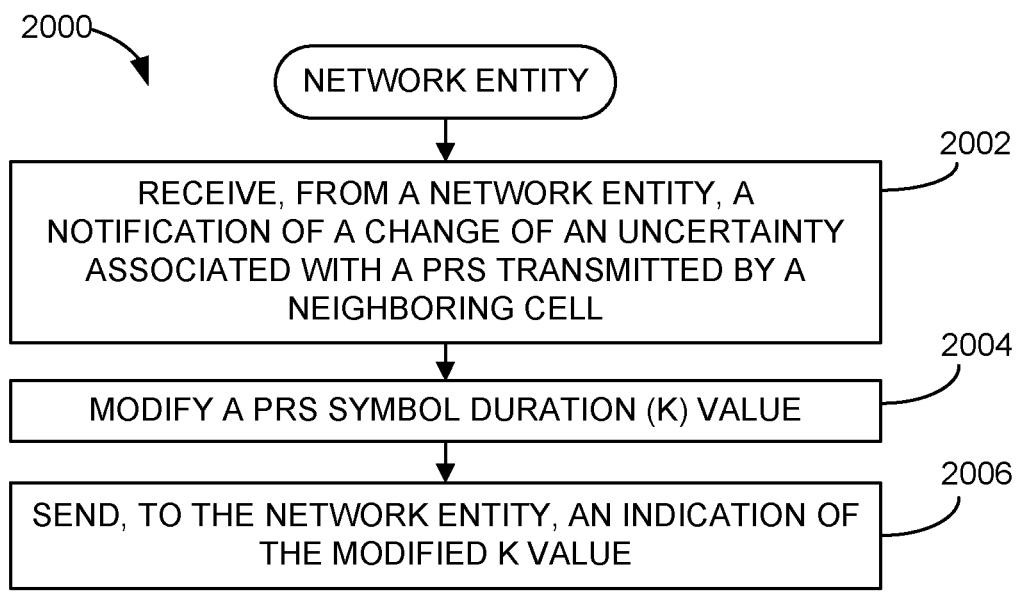

FIG. 20 illustrates a method 2000 for wireless communication according to aspects of the disclosure. In an aspect, method 2000 may be performed by a UE. In FIG. 20, the method includes: at 2002, receiving a notification of a change of an uncertainty associated with a positioning reference signal (PRS) transmitted by a neighboring cell of the serving cell; and at 2004, modifying a positioning reference signal (PRS) symbol duration (K) value based on the notification. The method may include, at 2006, sending, to the network entity, an indication of the modified K value.

Various aspects may include one or more of the following features. The network entity may include a location management function (LMF) or a location management server (LMS). The method receiving the notification of the change of the uncertainty may include receiving an updated value for a nr-DL-PRS-ExpectedRSTD-uncertainty parameter associated with the PRS transmitted by the neighboring cell. The UE may include a type 1 UE.

Implementations of the described techniques may include hardware, a method or process, or computer software on a computer-accessible medium.

The techniques described herein provide a number of technical benefits, including but not limited to improving device efficiency, reducing power consumption, and reducing complexity of a UE, by reducing the amount of time that the UE spends performing PRS measurements.

For example, if all the measured PRS are within a small portion of a slot, then the UE may turn its RF on with shorter duration (and doing fewer FFT operations) than having to buffer and process the whole slot. The UE power saving could be achieved by scheduling the PRS measurement within a smaller portion of a slot. The smaller number of PRS to be measured by the UE lead to a shorter "PRS symbol duration", which helps the UE save power by reducing its RF turn on time and other baseband processing.

Moreover, consideration of mobility status enables additional reduction of power consumption. For example, if the UE is static, the UE may just need to measure the PRS with larger period (larger "P") to achieve similar accuracy of positioning. For example, the location sever has the history of the UE's positioning over a period, so it can determine if the UE is static or moving. If the UE is static, network could indicate the UE to measure PRS with larger period, which reduces the UE's power consumption. When the UE switches its status from static to moving, the network can indicate higher period of PRS measurement to enable the UE tracking.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a network entity, the method comprising: determining a PRS measurement window period value (P) and a minimum PRS symbol duration value (K) to be used by a UE; and transmitting, to the UE, an indication of the P and the K to be used by the UE for measuring at least one PRS.

Clause 2. The method of clause 1, further comprising receiving, from the UE, a confirmation of a value of P, a value of K, or both, that the UE is using for PRS measurements.

Clause 3. The method of any of clauses 1 to 2, wherein determining P comprises selecting P from a plurality of PRS measurement window periods supported by the UE.

Clause 4. The method of any of clauses 1 to 3, wherein determining the P and the K comprises determining P, K, or both, based on a mobility status of the UE, a quality of a signal received by the UE, a necessity of the signal received by the UE, or both.

Clause 5. The method of clause 4, wherein determining P, K, or both, based on the mobility status of the UE comprises determining P based on a position of the UE.

Clause 6. The method of clause 5, wherein determining P based on the position of the UE comprises selecting a larger value for P if the position of the UE is known with a certainty greater than a first threshold and selecting a smaller value for P if the position of the UE is known with a certainly less than a second threshold.

Clause 7. The method of any of clauses 4 to 6, wherein determining P based on the mobility status of the UE comprises determining P based on a velocity of the UE.

Clause 8. The method of clause 7, wherein determining P based on the velocity of the UE comprises selecting a smaller value for P if the velocity of the UE is greater than a first threshold and selecting a larger value for P if the velocity of the UE is less than a second threshold.

Clause 9. The method of any of clauses 4 to 8, wherein determining P, K, or both, based on the quality of the signal received by the UE comprises determining P, K, or both, based on the quality of a RSRP, a RSRQ, a SINR, or combinations thereof.

Clause 10. The method of clause 9, wherein determining P, K, or both, based on the quality of the signal received by the UE comprises selecting a larger value for P if the quality of the signal received by the UE is greater than a first threshold and selecting a smaller value for P if the quality of the signal received by the UE is less than a second threshold.

Clause 11. The method of any of clauses 1 to 10, wherein transmitting the indication of the P and the K to be used by the UE comprises sending the indication via a MAC-CE, DCI, or combinations thereof.

Clause 12. The method of any of clauses 1 to 11, further comprising: prior to transmitting the indication of the P and the K to be used by the UE, receiving, from the UE, information that specifies a plurality of PRS measurement window periods supported by the UE; and wherein determining P comprises selecting one of the plurality of PRS measurement window periods supported by the UE.

Clause 13. The method of clause 12, wherein receiving the information that specifies the plurality of PRS measurement window periods supported by the UE further comprises receiving an indication of which one or more of the plurality of PRS measurement window periods supported by the UE is preferred by the UE.

Clause 14. The method of any of clauses 1 to 13, further comprising: receiving, from the UE, a plurality of PRS measurements, the plurality of PRS measurements comprising a measurement of a reference PRS transmitted by a serving cell of the UE and at least one measurement of a PRS transmitted by a neighboring cell of the serving cell; identifying, from the plurality of PRS measurements, an earliest PRS that satisfies a measurement quality threshold and a latest PRS that satisfies the measurement quality threshold; determining a value of K that provides a PRS symbol duration sufficient to contain the earliest PRS that satisfies the measurement quality threshold and the latest PRS that satisfies the measurement quality threshold; and transmitting, to the UE, the value of K.

Clause 15. The method of clause 14, further comprising receiving, from the UE, a confirmation of the value of K that will be used by the UE.

Clause 16. The method of any of clauses 14 to 15, wherein the measurement quality threshold comprises a threshold value for a RSRP, a RSRQ, a SINK, or combinations thereof.

Clause 17. The method of any of clauses 14 to 16, wherein determining the value of K that provides a PRS symbol duration sufficient to contain the earliest PRS that satisfies the measurement quality threshold and the latest PRS that satisfies the measurement quality threshold comprises determining a slot timing that extends from a beginning of the earliest PRS that satisfies the measurement quality threshold to an end of the latest PRS that satisfies the measurement quality threshold.

Clause 18. The method of any of clauses 14 to 17, wherein the network entity comprises an LMF or an LMS.

Clause 19. The method of any of clauses 14 to 18, wherein the UE comprises a Type 1 UE.

Clause 20. The method of any of clauses 1 to 19, further comprising: determining a change of an uncertainty associated with a PRS transmitted by a neighboring cell of a serving cell of the UE; and notifying the UE of the change of the uncertainty.

Clause 21. The method of clause 20, wherein determining the change of the uncertainty associated with a PRS transmitted by a neighboring cell of the serving cell of the UE comprises determining the change of the uncertainty based on a certainty of a position of the UE.

Clause 22. The method of clause 21, wherein the uncertainty associated with a PRS transmitted by a neighboring cell decreases as the certainty of the position of the UE increases and increases as the certainty of the position of the UE decreases.

Clause 23. The method of any of clauses 20 to 22, wherein notifying the UE of the change of the uncertainty comprises sending the UE an updated value for a nr-DL-PRS-ExpectedRSTD-Uncertainly parameter associated with the PRS transmitted by the neighboring cell.

Clause 24. The method of any of clauses 20 to 23, further comprising receiving, from the UE, an indication of a value of K to be used by the UE.

Clause 25. A method of wireless communication performed by a UE, the method comprising: receiving, from a network entity, an indication of a PRS measurement window period value (P) and a minimum PRS symbol duration value (K); and measuring, based at least in part on the P and the K, at least one PRS.

Clause 26. The method of clause 25, further comprising sending, to the network entity, a confirmation that the UE is using the P and the K for measuring at least one PRS.

Clause 27. The method of any of clauses 25 to 26, wherein the network entity comprises an LMF or an LMS.

Clause 28. The method of any of clauses 25 to 27, wherein receiving the indication of the P and the K comprises receiving the indication of the P and the K via a MAC-CE, DCI, or combinations thereof.

Clause 29. The method of any of clauses 25 to 28, wherein the UE comprises a Type 1 UE or a Type 2 UE.

Clause 30. The method of any of clauses 25 to 29, further comprising: prior to receiving the indication of the P and the K, sending, to the network entity, information that specifies a plurality of PRS measurement window periods supported by the UE.

Clause 31. The method of clause 30, wherein sending the information that specifies the plurality of PRS measurement window periods supported by the UE further comprises sending an indication of which one or more of the plurality of PRS measurement window periods supported by the UE is preferred by the UE.

Clause 32. The method of any of clauses 25 to 31, further comprising: receiving, from the network entity, an instruction to modify a value of P being used by the UE, a value of K being used by the UE, or both; and modifying the value of P, the value of K, or both, according to the instruction.

Clause 33. The method of clause 32, further comprising sending, to the network entity, a confirmation that the value of P was modified, that the value of K was modified, or both.

Clause 34. The method of any of clauses 32 to 33, wherein receiving the instruction to modify the value of P being used by the UE, the value of K being used by the UE, or both comprises receiving the instruction via a MAC-CE, DCI, or combinations thereof.

Clause 35. The method of any of clauses 25 to 34, further comprising: performing a plurality of PRS measurements, the plurality of PRS measurements comprising a measurement of a reference PRS transmitted by a serving cell of the UE and at least one measurement of a PRS transmitted by a neighboring cell of the serving cell; identifying, from the plurality of PRS measurements, an earliest PRS that satisfies a measurement quality threshold and a latest PRS that satisfies the measurement quality threshold; determining a value of K that provides a PRS symbol duration sufficient to contain the earliest PRS that satisfies the measurement quality threshold and latest PRS that satisfies the measurement quality threshold; and transmitting, to a network node, the value of K.

Clause 36. The method of clause 35, wherein determining the value of K that provides a PRS symbol duration sufficient to contain the earliest PRS that satisfies the measurement quality threshold and the latest PRS that satisfies the measurement quality threshold comprises determining a slot timing that extends from a beginning of the earliest PRS that satisfies the measurement quality threshold to an end of the latest PRS that satisfies the measurement quality threshold.

Clause 37. The method of any of clauses 35 to 36, further comprising receiving, from the network node, an indication to use the value of K.

Clause 38. The method of any of clauses 36 to 37, further comprising sending, to the network node, a confirmation that the value of K will be used.

Clause 39. The method of any of clauses 35 to 38, wherein the measurement quality threshold comprises a threshold value for a RSRP, a RSRQ, a SINK, or combinations thereof.

Clause 40. The method of any of clauses 25 to 39, further comprising: receiving, from the network entity, a notification of a change of an uncertainty associated with a PRS transmitted by a neighboring cell of a serving cell of the UE; and modifying a value of K based on the notification.

Clause 41. The method of clause 40, further comprising sending, to the network entity, an indication of that the value of K was modified.

Clause 42. The method of any of clauses 40 to 41, wherein receiving the notification of the change of the uncertainty comprises receiving an updated value for a nr-DL-PRS-ExpectedRSTD-Uncertainty parameter associated with the PRS transmitted by the neighboring cell.

Clause 43. A network entity, comprising: a memory; at least one transceiver; and at least one processor communicatively coupled to the memory and the at least one transceiver, the at least one processor configured to: determine a PRS measurement window period value (P) and a minimum PRS symbol duration value (K) to be used by a UE; and transmit, via the at least one transceiver, to the UE, an indication of the P and the K to be used by the UE for measuring at least one PRS.

Clause 44. The network entity of clause 43, wherein the at least one processor is further configured to receive, via the at least one transceiver, from the UE, a confirmation of a value of P, a value of K, or both, that the UE is using for PRS measurements.

Clause 45. The network entity of any of clauses 43 to 44, wherein, to determine P, the at least one processor is configured to select P from a plurality of PRS measurement window periods supported by the UE.

Clause 46. The network entity of any of clauses 43 to 45, wherein, to determine the P and the K, the at least one processor is configured to determine P, K, or both, based on a mobility status of the UE, a quality of a signal received by the UE, a necessity of the signal received by the UE, or both.

Clause 47. The network entity of clause 46, wherein, to determine P, K, or both, based on the mobility status of the UE, the at least one processor is configured to determine P based on a position of the UE.

Clause 48. The network entity of clause 47, wherein, to determine P based on the position of the UE, the at least one processor is configured to select a larger value for P if the position of the UE is known with a certainty greater than a first threshold and selecting a smaller value for P if the position of the UE is known with a certainly less than a second threshold.

Clause 49. The network entity of any of clauses 46 to 48, wherein, to determine P based on the mobility status of the UE, the at least one processor is configured to determine P based on a velocity of the UE.

Clause 50. The network entity of clause 49, wherein, to determine P based on the velocity of the UE, the at least one processor is configured to select a smaller value for P if the velocity of the UE is greater than a first threshold and selecting a larger value for P if the velocity of the UE is less than a second threshold.

Clause 51. The network entity of any of clauses 46 to 50, wherein, to determine P, K, or both, based on the quality of the signal received by the UE, the at least one processor is configured to determine P, K, or both, based on the quality of a RSRP, a RSRQ, a SINR, or combinations thereof.

Clause 52. The network entity of clause 51, wherein, to determine P, K, or both, based on the quality of the signal received by the UE, the at least one processor is configured to select a larger value for P if the quality of the signal received by the UE is greater than a first threshold and selecting a smaller value for P if the quality of the signal received by the UE is less than a second threshold.

Clause 53. The network entity of any of clauses 43 to 52, wherein, to transmit the indication of the P and the K to be used by the UE, the at least one processor is configured to send the indication via a MAC-CE, DCI, or combinations thereof.

Clause 54. The network entity of any of clauses 43 to 53, wherein the at least one processor is further configured to: prior to transmitting the indication of the P and the K to be used by the UE, receiving, from the UE, information that specifies a plurality of PRS measurement window periods supported by the UE; and wherein, to determine P, the at least one processor is configured to select one of the plurality of PRS measurement window periods supported by the UE.

Clause 55. The network entity of clause 54, wherein, to receive the information that specifies the plurality of PRS measurement window periods supported by the UE, the at least one processor is configured to receive an indication of which one or more of the plurality of PRS measurement window periods supported by the UE is preferred by the UE.

Clause 56. The network entity of any of clauses 43 to 55, wherein the at least one processor is further configured to: receive, via the at least one transceiver, from the UE, a plurality of PRS measurements, the plurality of PRS measurements comprising a measurement of a reference PRS transmitted by a serving cell of the UE and at least one measurement of a PRS transmitted by a neighboring cell of the serving cell; identify, from the plurality of PRS measurements, an earliest PRS that satisfies a measurement quality threshold and a latest PRS that satisfies the measurement quality threshold; determine a value of K that provides a PRS symbol duration sufficient to contain the earliest PRS that satisfies the measurement quality threshold and the latest PRS that satisfies the measurement quality threshold; and transmit, via the at least one transceiver, to the UE, the value of K.

Clause 57. The network entity of clause 56, wherein the at least one processor is further configured to receive, via the at least one transceiver, from the UE, a confirmation of the value of K that will be used by the UE.

Clause 58. The network entity of any of clauses 56 to 57, wherein the measurement quality threshold comprises a threshold value for a RSRP, a RSRQ, a SINK, or combinations thereof.

Clause 59. The network entity of any of clauses 56 to 58, wherein, to determine the value of K that provides a PRS symbol duration sufficient to contain the earliest PRS that satisfies the measurement quality threshold and the latest PRS that satisfies the measurement quality threshold, the at least one processor is configured to determine a slot timing that extends from a beginning of the earliest PRS that satisfies the measurement quality threshold to an end of the latest PRS that satisfies the measurement quality threshold.

Clause 60. The network entity of any of clauses 56 to 59, wherein the network entity comprises an LMF or an LMS.

Clause 61. The network entity of any of clauses 56 to 60, wherein the UE comprises a Type 1 UE.

Clause 62. The network entity of any of clauses 43 to 61, wherein the at least one processor is further configured to: determine a change of an uncertainty associated with a PRS transmitted by a neighboring cell of a serving cell of the UE; and notify the UE of the change of the uncertainty.

Clause 63. The network entity of clause 62, wherein, to determine the change of the uncertainty associated with a PRS transmitted by a neighboring cell of the serving cell of the UE, the at least one processor is configured to determine the change of the uncertainty based on a certainty of a position of the UE.

Clause 64. The network entity of clause 63, wherein the uncertainty associated with a PRS transmitted by a neighboring cell decreases as the certainty of the position of the UE increases and increases as the certainty of the position of the UE decreases.

Clause 65. The network entity of any of clauses 62 to 64, wherein, to notify the UE of the change of the uncertainty, the at least one processor is configured to send the UE an updated value for a nr-DL-PRS-ExpectedRSTD-Uncertainty parameter associated with the PRS transmitted by the neighboring cell.

Clause 66. The network entity of any of clauses 62 to 65, wherein the at least one processor is further configured to receive, via the at least one transceiver, from the UE, an indication of a value of K to be used by the UE.

Clause 67. A UE, comprising: a memory; at least one transceiver; and at least one processor communicatively coupled to the memory and the at least one transceiver, the at least one processor configured to: receive, via the at least one transceiver, from a network entity, an indication of a PRS measurement window period value (P) and a minimum PRS symbol duration value (K); and use the P and the K for measuring at least one PRS.

Clause 68. The UE of clause 67, wherein the at least one processor is further configured to send, via the at least one transceiver, to the network entity, a confirmation that the UE is using the P and the K for measuring at least one PRS.

Clause 69. The UE of any of clauses 67 to 68, wherein the network entity comprises an LMF or an LMS.

Clause 70. The UE of any of clauses 67 to 69, wherein, to receive the indication of the P and the K, the at least one processor is configured to receive the indication of the P and the K via a MAC-CE, DCI, or combinations thereof.

Clause 71. The UE of any of clauses 67 to 70, wherein the UE comprises a Type 1 UE or a Type 2 UE.

Clause 72. The UE of any of clauses 67 to 71, wherein the at least one processor is further configured to: prior to receiving the indication of the P and the K, sending, to the network entity, information that specifies a plurality of PRS measurement window periods supported by the UE.

Clause 73. The UE of clause 72, wherein, to send the information that specifies the plurality of PRS measurement window periods supported by the UE, the at least one processor is configured to send an indication of which one or more of the plurality of PRS measurement window periods supported by the UE is preferred by the UE.

Clause 74. The UE of any of clauses 67 to 73, wherein the at least one processor is further configured to: receive, via the at least one transceiver, from the network entity, an instruction to modify a value of P being used by the UE, a value of K being used by the UE, or both; and modify the value of P, the value of K, or both, according to the instruction.

Clause 75. The UE of clause 74, wherein the at least one processor is further configured to send, via the at least one transceiver, to the network entity, a confirmation that the value of P was modified, that the value of K was modified, or both.

Clause 76. The UE of any of clauses 74 to 75, wherein, to receive the instruction to modify the value of P being used by the UE, the value of K being used by the UE, or both, the at least one processor is configured to receive the instruction via a MAC-CE, DCI, or combinations thereof.

Clause 77. The UE of any of clauses 67 to 76, wherein the at least one processor is further configured to: perform a plurality of PRS measurements, the plurality of PRS measurements comprising a measurement of a reference PRS transmitted by a serving cell of the UE and at least one measurement of a PRS transmitted by a neighboring cell of the serving cell; identify, from the plurality of PRS measurements, an earliest PRS that satisfies a measurement quality threshold and a latest PRS that satisfies the measurement quality threshold; determine a value of K that provides a PRS symbol duration sufficient to contain the earliest PRS that satisfies the measurement quality threshold and latest PRS that satisfies the measurement quality threshold; and transmit, via the at least one transceiver, to a network node, the value of K.

Clause 78. The UE of clause 77, wherein, to determine a value of K that provides a PRS symbol duration sufficient to contain the earliest PRS that satisfies the measurement quality threshold and the latest PRS that satisfies the measurement quality threshold, the at least one processor is configured to determine a slot timing that extends from a beginning of the earliest PRS that satisfies the measurement quality threshold to an end of the latest PRS that satisfies the measurement quality threshold.

Clause 79. The UE of any of clauses 77 to 78, wherein the at least one processor is further configured to receive, via the at least one transceiver, from the network node, an indication to use the value of K.

Clause 80. The UE of any of clauses 78 to 79, wherein the at least one processor is further configured to send, via the at least one transceiver, to the network node, a confirmation that the value of K will be used.

Clause 81. The UE of any of clauses 77 to 80, wherein the measurement quality threshold comprises a threshold value for a RSRP, a RSRQ, a SINR, or combinations thereof.

Clause 82. The UE of any of clauses 67 to 81, wherein the at least one processor is further configured to: receive, via the at least one transceiver, from the network entity, a notification of a change of an uncertainty associated with a PRS transmitted by a neighboring cell of a serving cell of the UE; and modify a value of K based on the notification.

Clause 83. The UE of clause 82, wherein the at least one processor is further configured to send, via the at least one transceiver, to the network entity, an indication of that the value of K was modified.

Clause 84. The UE of any of clauses 82 to 83, wherein, to receive the notification of the change of the uncertainty, the at least one processor is configured to receive an updated value for a nr-DL-PRS-ExpectedRSTD-Uncertainty parameter associated with the PRS transmitted by the neighboring cell.

Clause 85. A network entity, comprising means for determining a PRS measurement window period value (P) and a minimum PRS symbol duration value (K) to be used by a UE and means for transmitting, to the UE, an indication of the P and the K to be used by the UE for measuring at least one PRS.

Clause 86. The network entity of clause 85, further comprising means for receiving, from the UE, a confirmation of a value of P, a value of K, or both, that the UE is using for PRS measurements.

Clause 87. The network entity of any of clauses 85 to 86, wherein the means for determining P comprises means for selecting P from a plurality of PRS measurement window periods supported by the UE.

Clause 88. The network entity of any of clauses 85 to 87, wherein the means for determining the P and the K comprises means for determining P, K, or both, based on a mobility status of the UE, a quality of a signal received by the UE, a necessity of the signal received by the UE, or both.

Clause 89. The network entity of clause 88, wherein the means for determining P, K, or both, based on the mobility status of the UE comprises means for determining P based on a position of the UE.

Clause 90. The network entity of clause 89, wherein the means for determining P based on the position of the UE comprises means for selecting a larger value for P if the position of the UE is known with a certainty greater than a first threshold and selecting a smaller value for P if the position of the UE is known with a certainly less than a second threshold.

Clause 91. The network entity of any of clauses 88 to 90, wherein the means for determining P based on the mobility status of the UE comprises means for determining P based on a velocity of the UE.

Clause 92. The network entity of clause 91, wherein the means for determining P based on the velocity of the UE comprises means for selecting a smaller value for P if the velocity of the UE is greater than a first threshold and selecting a larger value for P if the velocity of the UE is less than a second threshold.

Clause 93. The network entity of any of clauses 88 to 92, wherein the means for determining P, K, or both, based on the quality of the signal received by the UE comprises means for determining P, K, or both, based on the quality of a RSRP, a RSRQ, a SINR, or combinations thereof.

Clause 94. The network entity of clause 93, wherein the means for determining P, K, or both, based on the quality of the signal received by the UE comprises means for selecting a larger value for P if the quality of the signal received by the UE is greater than a first threshold and selecting a smaller value for P if the quality of the signal received by the UE is less than a second threshold.

Clause 95. The network entity of any of clauses 85 to 94, wherein the means for transmitting the indication of the P and the K to be used by the UE comprises means for sending the indication via a MAC-CE, DCI, or combinations thereof.

Clause 96. The network entity of any of clauses 85 to 95, further comprising: means for, prior to transmitting the indication of the P and the K to be used by the UE, receiving, from the UE, information that specifies a plurality of PRS measurement window periods supported by the UE; and wherein the means for determining P comprises means for selecting one of the plurality of PRS measurement window periods supported by the UE.

Clause 97. The network entity of clause 96, wherein the means for receiving the information that specifies the plurality of PRS measurement window periods supported by the UE further comprises means for receiving an indication of which one or more of the plurality of PRS measurement window periods supported by the UE is preferred by the UE.

Clause 98. The network entity of any of clauses 85 to 97, further comprising: means for receiving, from the UE, a plurality of PRS measurements, the plurality of PRS measurements comprising a measurement of a reference PRS transmitted by a serving cell of the UE and at least one measurement of a PRS transmitted by a neighboring cell of the serving cell; means for identifying, from the plurality of PRS measurements, an earliest PRS that satisfies a measurement quality threshold and a latest PRS that satisfies the measurement quality threshold; means for determining a value of K that provides a PRS symbol duration sufficient to contain the earliest PRS that satisfies the measurement quality threshold and the latest PRS that satisfies the measurement quality threshold; and means for transmitting, to the UE, the value of K.

Clause 99. The network entity of clause 98, further comprising means for receiving, from the UE, a confirmation of the value of K that will be used by the UE.

Clause 100. The network entity of any of clauses 98 to 99, wherein the measurement quality threshold comprises a threshold value for a RSRP, a RSRQ, a SINK, or combinations thereof.

Clause 101. The network entity of any of clauses 98 to 100, wherein the means for determining the value of K that provides a PRS symbol duration sufficient to contain the earliest PRS that satisfies the measurement quality threshold and the latest PRS that satisfies the measurement quality threshold comprises means for determining a slot timing that extends from a beginning of the earliest PRS that satisfies the measurement quality threshold to an end of the latest PRS that satisfies the measurement quality threshold.

Clause 102. The network entity of any of clauses 98 to 101, wherein the network entity comprises an LMF or an LMS.

Clause 103. The network entity of any of clauses 98 to 102, wherein the UE comprises a Type 1 UE.

Clause 104. The network entity of any of clauses 85 to 103, further comprising: means for determining a change of an uncertainty associated with a PRS transmitted by a neighboring cell of a serving cell of the UE; and means for notifying the UE of the change of the uncertainty.

Clause 105. The network entity of clause 104, wherein the means for determining the change of the uncertainty associated with a PRS transmitted by a neighboring cell of the serving cell of the UE comprises means for determining the change of the uncertainty based on a certainty of a position of the UE.

Clause 106. The network entity of clause 105, wherein the uncertainty associated with a PRS transmitted by a neighboring cell decreases as the certainty of the position of the UE increases and increases as the certainty of the position of the UE decreases.

Clause 107. The network entity of any of clauses 104 to 106, wherein the means for notifying the UE of the change of the uncertainty comprises means for sending the UE an updated value for a nr-DL-PRS-ExpectedRSTD-Uncertainty parameter associated with the PRS transmitted by the neighboring cell.

Clause 108. The network entity of any of clauses 104 to 107, further comprising means for receiving, from the UE, an indication of a value of K to be used by the UE.

Clause 109. A UE, comprising means for receiving, from a network entity, an indication of a PRS measurement window period value (P) and a minimum PRS symbol duration value (K); and means for using the P and the K for measuring at least one PRS.

Clause 110. The UE of clause 109, further comprising means for sending, to the network entity, a confirmation that the UE is using the P and the K for measuring at least one PRS.

Clause 111. The UE of any of clauses 109 to 110, wherein the network entity comprises an LMF or an LMS.

Clause 112. The UE of any of clauses 109 to 111, wherein the means for receiving the indication of the P and the K comprises means for receiving the indication of the P and the K via a MAC-CE, DCI, or combinations thereof.

Clause 113. The UE of any of clauses 109 to 112, wherein the UE comprises a Type 1 UE or a Type 2 UE.

Clause 114. The UE of any of clauses 109 to 113, further comprising: means for, prior to receiving the indication of the P and the K, sending, to the network entity, information that specifies a plurality of PRS measurement window periods supported by the UE.

Clause 115. The UE of clause 114, wherein the means for sending the information that specifies the plurality of PRS measurement window periods supported by the UE further comprises means for sending an indication of which one or more of the plurality of PRS measurement window periods supported by the UE is preferred by the UE.

Clause 116. The UE of any of clauses 109 to 115, further comprising: means for receiving, from the network entity, an instruction to modify a value of P being used by the UE, a value of K being used by the UE, or both; and means for modifying the value of P, the value of K, or both, according to the instruction.

Clause 117. The UE of clause 116, further comprising means for sending, to the network entity, a confirmation that the value of P was modified, that the value of K was modified, or both.

Clause 118. The UE of any of clauses 116 to 117, wherein the means for receiving the instruction to modify the value of P being used by the UE, the value of K being used by the UE, or both comprises means for receiving the instruction via a MAC-CE, DCI, or combinations thereof.

Clause 119. The UE of any of clauses 109 to 118, further comprising: means for performing a plurality of PRS measurements, the plurality of PRS measurements comprising a measurement of a reference PRS transmitted by a serving cell of the UE and at least one measurement of a PRS transmitted by a neighboring cell of the serving cell; means for identifying, from the plurality of PRS measurements, an earliest PRS that satisfies a measurement quality threshold and a latest PRS that satisfies the measurement quality threshold; means for determining a value of K that provides a PRS symbol duration sufficient to contain the earliest PRS that satisfies the measurement quality threshold and latest PRS that satisfies the measurement quality threshold; and means for transmitting, to a network node, the value of K.

Clause 120. The UE of clause 119, wherein the means for determining a value of K that provides a PRS symbol duration sufficient to contain the earliest PRS that satisfies the measurement quality threshold and the latest PRS that satisfies the measurement quality threshold comprises means for determining a slot timing that extends from a beginning of the earliest PRS that satisfies the measurement quality threshold to an end of the latest PRS that satisfies the measurement quality threshold.

Clause 121. The UE of any of clauses 119 to 120, further comprising means for receiving, from the network node, an indication to use the value of K.

Clause 122. The UE of any of clauses 120 to 121, further comprising means for sending, to the network node, a confirmation that the value of K will be used.

Clause 123. The UE of any of clauses 119 to 122, wherein the measurement quality threshold comprises a threshold value for a RSRP, a RSRQ, a SINK, or combinations thereof.

Clause 124. The UE of any of clauses 109 to 123, further comprising: means for receiving, from the network entity, a notification of a change of an uncertainty associated with a PRS transmitted by a neighboring cell of a serving cell of the UE; and means for modifying a value of K based on the notification.

Clause 125. The UE of clause 124, further comprising means for sending, to the network entity, an indication of that the value of K was modified.

Clause 126. The UE of any of clauses 124 to 125, wherein the means for receiving the notification of the change of the uncertainty comprises means for receiving an updated value for a nr-DL-PRS-ExpectedRSTD-Uncertainty parameter associated with the PRS transmitted by the neighboring cell.

Clause 127. A non-transitory computer-readable medium storing computer-executable instructions that, when executed by a network entity, cause the network entity to determine a PRS measurement window period value (P) and a minimum PRS symbol duration value (K) to be used by a UE; and transmit, to the UE, an indication of the P and the K to be used by the UE for measuring at least one PRS.

Clause 128. The non-transitory computer-readable medium of clause 127, further comprising instructions that, when executed by network entity, further cause the network entity to receive, from the UE, a confirmation of a value of P, a value of K, or both, that the UE is using for PRS measurements.

Clause 129. The non-transitory computer-readable medium of any of clauses 127 to 128, wherein the computer-executable instructions that, when executed, cause the network entity to determine P comprise computer-executable instructions that, when executed, cause the network entity to select P from a plurality of PRS measurement window periods supported by the UE.

Clause 130. The non-transitory computer-readable medium of any of clauses 127 to 129, wherein the computer-executable instructions that, when executed, cause the network entity to determine the P and the K comprise computer-executable instructions that, when executed, cause the network entity to determine P, K, or both, based on a mobility status of the UE, a quality of a signal received by the UE, a necessity of the signal received by the UE, or both.

Clause 131. The non-transitory computer-readable medium of clause 130, wherein the computer-executable instructions that, when executed, cause the network entity to determine P, K, or both, based on the mobility status of the UE comprise computer-executable instructions that, when executed, cause the network entity to determine P based on a position of the UE.

Clause 132. The non-transitory computer-readable medium of clause 131, wherein the computer-executable instructions that, when executed, cause the network entity to determine P based on the position of the UE comprise computer-executable instructions that, when executed, cause the network entity to select a larger value for P if the position of the UE is known with a certainty greater than a first threshold and select a smaller value for P if the position of the UE is known with a certainly less than a second threshold.

Clause 133. The non-transitory computer-readable medium of any of clauses 130 to 132, wherein the computer-executable instructions that, when executed, cause the network entity to determine P based on the mobility status of the UE comprise computer-executable instructions that, when executed, cause the network entity to determine P based on a velocity of the UE.

Clause 134. The non-transitory computer-readable medium of clause 133, wherein the computer-executable instructions that, when executed, cause the network entity to determine P based on the velocity of the UE comprise computer-executable instructions that, when executed, cause the network entity to select a smaller value for P if the velocity of the UE is greater than a first threshold and select a larger value for P if the velocity of the UE is less than a second threshold.

Clause 135. The non-transitory computer-readable medium of any of clauses 130 to 134, wherein the computer-executable instructions that, when executed, cause the network entity to determine P, K, or both, based on the quality of the signal received by the UE comprise computer-executable instructions that, when executed, cause the network entity to determine P, K, or both, based on the quality of a RSRP, a RSRQ, a SINR, or combinations thereof.

Clause 136. The non-transitory computer-readable medium of clause 135, wherein the computer-executable instructions that, when executed, cause the network entity to determine P, K, or both, based on the quality of the signal received by the UE comprise computer-executable instructions that, when executed, cause the network entity to select a larger value for P if the quality of the signal received by the UE is greater than a first threshold and select a smaller value for P if the quality of the signal received by the UE is less than a second threshold.

Clause 137. The non-transitory computer-readable medium of any of clauses 127 to 136, wherein the computer-executable instructions that, when executed, cause the network entity to transmit the indication of the P and the K to be used by the UE comprise computer-executable instructions that, when executed, cause the network entity to send the indication via a MAC-CE, DCI, or combinations thereof.

Clause 138. The non-transitory computer-readable medium of any of clauses 127 to 137, further comprising instructions that, when executed by network entity, further cause the network entity to: prior to transmitting the indication of the P and the K to be used by the UE, receive, from the UE, information that specifies a plurality of PRS measurement window periods supported by the UE; and wherein the computer-executable instructions that, when executed, cause the network entity to determine P comprise computer-executable instructions that, when executed, cause the network entity to select one of the plurality of PRS measurement window periods supported by the UE.

Clause 139. The non-transitory computer-readable medium of clause 138, wherein the computer-executable instructions that, when executed, cause the network entity to receive the information that specifies the plurality of PRS measurement window periods supported by the UE comprise computer-executable instructions that, when executed, cause the network entity to receive an indication of which one or more of the plurality of PRS measurement window periods supported by the UE is preferred by the UE.

Clause 140. The non-transitory computer-readable medium of any of clauses 127 to 139, further comprising instructions that, when executed by network entity, further cause the network entity to: receive, from the UE, a plurality of PRS measurements, the plurality of PRS measurements comprising a measurement of a reference PRS transmitted by a serving cell of the UE and at least one measurement of a PRS transmitted by a neighboring cell of the serving cell; identify, from the plurality of PRS measurements, an earliest PRS that satisfies a measurement quality threshold and a latest PRS that satisfies the measurement quality threshold; determine a value of K that provides a PRS symbol duration sufficient to contain the earliest PRS that satisfies the measurement quality threshold and the latest PRS that satisfies the measurement quality threshold; and transmit, to the UE, the value of K.

Clause 141. The non-transitory computer-readable medium of clause 140, further comprising instructions that, when executed by network entity, further cause the network entity to receive, from the UE, a confirmation of the value of K that will be used by the UE.

Clause 142. The non-transitory computer-readable medium of any of clauses 140 to 141, wherein the measurement quality threshold comprises a threshold value for a RSRP, a RSRQ, a SINK, or combinations thereof.

Clause 143. The non-transitory computer-readable medium of any of clauses 140 to 142, wherein the computer-executable instructions that, when executed, cause the network entity to determine the value of K that provides a PRS symbol duration sufficient to contain the earliest PRS that satisfies the measurement quality threshold and the latest PRS that satisfies the measurement quality threshold comprise computer-executable instructions that, when executed, cause the network entity to determine a slot timing that extends from a beginning of the earliest PRS that satisfies the measurement quality threshold to an end of the latest PRS that satisfies the measurement quality threshold.

Clause 144. The non-transitory computer-readable medium of any of clauses 140 to 143, wherein the network entity comprises an LMF or an LMS.

Clause 145. The non-transitory computer-readable medium of any of clauses 140 to 144, wherein the UE comprises a Type 1 UE.

Clause 146. The non-transitory computer-readable medium of any of clauses 127 to 145, further comprising instructions that, when executed by network entity, further cause the network entity to: determine a change of an uncertainty associated with a PRS transmitted by a neighboring cell of a serving cell of the UE; and notify the UE of the change of the uncertainty.

Clause 147. The non-transitory computer-readable medium of clause 146, wherein the computer-executable instructions that, when executed, cause the network entity to determine the change of the uncertainty associated with a PRS transmitted by a neighboring cell of the serving cell of the UE comprise computer-executable instructions that, when executed, cause the network entity to determine the change of the uncertainty based on a certainty of a position of the UE.

Clause 148. The non-transitory computer-readable medium of clause 147, wherein the uncertainty associated with a PRS transmitted by a neighboring cell decreases as the certainty of the position of the UE increases and increases as the certainty of the position of the UE decreases.

Clause 149. The non-transitory computer-readable medium of any of clauses 146 to 148, wherein the computer-executable instructions that, when executed, cause the network entity to notify the UE of the change of the uncertainty comprise computer-executable instructions that, when executed, cause the network entity to send the UE an updated value for a nr-DL-PRS-ExpectedRSTD-Uncertainty parameter associated with the PRS transmitted by the neighboring cell.

Clause 150. The non-transitory computer-readable medium of any of clauses 146 to 149, further comprising instructions that, when executed by network entity, further cause the network entity to receive, from the UE, an indication of a value of K to be used by the UE.

Clause 151. A non-transitory computer-readable medium storing computer-executable instructions that, when executed by a UE, cause the UE to receive, from a network entity, an indication of a PRS measurement window period value (P) and a minimum PRS symbol duration value (K); and use the P and the K for measuring at least one PRS.

Clause 152. The non-transitory computer-readable medium of clause 151, further comprising instructions that, when executed by UE, further cause the UE to send, to the network entity, a confirmation that the UE is using the P and the K for measuring at least one PRS.

Clause 153. The non-transitory computer-readable medium of any of clauses 151 to 152, wherein the network entity comprises an LMF or an LMS.

Clause 154. The non-transitory computer-readable medium of any of clauses 151 to 153, wherein the computer-executable instructions that, when executed, cause the UE to receive the indication of the P and the K comprise computer-executable instructions that, when executed, cause the UE to receive the indication of the P and the K via a MAC-CE, DCI, or combinations thereof.

Clause 155. The non-transitory computer-readable medium of any of clauses 151 to 154, wherein the UE comprises a Type 1 UE or a Type 2 UE.

Clause 156. The non-transitory computer-readable medium of any of clauses 151 to 155, further comprising instructions that, when executed by UE, further cause the UE to: prior to receiving the indication of the P and the K, send, to the network entity, information that specifies a plurality of PRS measurement window periods supported by the UE.

Clause 157. The non-transitory computer-readable medium of clause 156, wherein the computer-executable instructions that, when executed, cause the UE to send the information that specifies the plurality of PRS measurement window periods supported by the UE comprise computer-executable instructions that, when executed, cause the UE to send an indication of which one or more of the plurality of PRS measurement window periods supported by the UE is preferred by the UE.

Clause 158. The non-transitory computer-readable medium of any of clauses 151 to 157, further comprising instructions that, when executed by UE, further cause the UE to: receive, from the network entity, an instruction to modify a value of P being used by the UE, a value of K being used by the UE, or both; and modify the value of P, the value of K, or both, according to the instruction.

Clause 159. The non-transitory computer-readable medium of clause 158, further comprising instructions that, when executed by UE, further cause the UE to send, to the network entity, a confirmation that the value of P was modified, that the value of K was modified, or both.

Clause 160. The non-transitory computer-readable medium of any of clauses 158 to 159, wherein the computer-executable instructions that, when executed, cause the UE to receive the instruction to modify the value of P being used by the UE, the value of K being used by the UE, or both comprise computer-executable instructions that, when executed, cause the UE to receive the instruction via a MAC-CE, DCI, or combinations thereof.

Clause 161. The non-transitory computer-readable medium of any of clauses 151 to 160, further comprising instructions that, when executed by UE, further cause the UE to: perform a plurality of PRS measurements, the plurality of PRS measurements comprising a measurement of a reference PRS transmitted by a serving cell of the UE and at least one measurement of a PRS transmitted by a neighboring cell of the serving cell; identify, from the plurality of PRS measurements, an earliest PRS that satisfies a measurement quality threshold and a latest PRS that satisfies the measurement quality threshold; determine a value of K that provides a PRS symbol duration sufficient to contain the earliest PRS that satisfies the measurement quality threshold and latest PRS that satisfies the measurement quality threshold; and transmit, to a network node, the value of K.

Clause 162. The non-transitory computer-readable medium of clause 161, wherein the computer-executable instructions that, when executed, cause the UE to determine a value of K that provides a PRS symbol duration sufficient to contain the earliest PRS that satisfies the measurement quality threshold and the latest PRS that satisfies the measurement quality threshold comprise computer-executable instructions that, when executed, cause the UE to determine a slot timing that extends from a beginning of the earliest PRS that satisfies the measurement quality threshold to an end of the latest PRS that satisfies the measurement quality threshold.

Clause 163. The non-transitory computer-readable medium of any of clauses 161 to 162, further comprising instructions that, when executed by UE, further cause the UE to receive, from the network node, an indication to use the value of K.

Clause 164. The non-transitory computer-readable medium of any of clauses 162 to 163, further comprising instructions that, when executed by UE, further cause the UE to send, to the network node, a confirmation that the value of K will be used.

Clause 165. The non-transitory computer-readable medium of any of clauses 161 to 164, wherein the measurement quality threshold comprises a threshold value for a RSRP, a RSRQ, a SINK, or combinations thereof.

Clause 166. The non-transitory computer-readable medium of any of clauses 151 to 165, further comprising instructions that, when executed by UE, further cause the UE to: receive, from the network entity, a notification of a change of an uncertainty associated with a PRS transmitted by a neighboring cell of a serving cell of the UE; and modify a value of K based on the notification.

Clause 167. The non-transitory computer-readable medium of clause 166, further comprising instructions that, when executed by UE, further cause the UE to send, to the network entity, an indication of that the value of K was modified.

Clause 168. The non-transitory computer-readable medium of any of clauses 166 to 167, wherein the computer-executable instructions that, when executed, cause the UE to receive the notification of the change of the uncertainty comprise computer-executable instructions that, when executed, cause the UE to receive an updated value for a nr-DL-PRS-ExpectedRSTD-Uncertainty parameter associated with the PRS transmitted by the neighboring cell.

Clause 169. An apparatus comprising a memory, a transceiver, and a processor communicatively coupled to the memory and the transceiver, the memory, the transceiver, and the processor configured to perform a method according to any of clauses 1 to 42.

Clause 170. An apparatus comprising means for performing a method according to any of clauses 1 to 42.

Clause 171. A non-transitory computer-readable medium storing computer-executable instructions, the computer-executable comprising at least one instruction for causing a computer or processor to perform a method according to any of clauses 1 to 42.

Other aspects include, but are not limited to, the following.

In an aspect, a method of wireless communication performed by a network entity includes transmitting, to a user equipment (UE), information that specifies a plurality of positioning reference signal (PRS) measurement window period (P) values; selecting one of the plurality of P values to be used by the UE; and instructing the UE to use the selected P value.

In some aspects, the method includes receiving, from the UE, a confirmation of the P value to be used by the UE.

In some aspects, the network entity comprises a location management function (LMF) or a location management server (LMS).

In some aspects, transmitting the information that specifies a plurality of P values comprises broadcasting the information to a plurality of UEs.

In some aspects, selecting one of the plurality of P values comprises selecting a P value based on a mobility status of the UE and/or a quality of a signal received by the UE.

In some aspects, a mobility status of the UE comprises a position of the UE.

In some aspects, selecting one of the plurality of P values comprises selecting a larger value for P if the position of the UE is known with a certainty greater than a first threshold and selecting a smaller value for P if the position of the UE is known with a certainly less than a second threshold.

In some aspects, a mobility status of the UE comprises a velocity of the UE.

In some aspects, selecting one of the plurality of P values comprises selecting a smaller value for P if the velocity of the UE is greater than a first threshold and selecting a larger value for P if the velocity of the UE is less than a second threshold.

In some aspects, a quality of a signal received by the UE comprises a reference signal received power (RSRP), a reference signal received quality (RSRQ), and/or a signal to interference plus noise ratio (SINR).

In some aspects, selecting one of the plurality of P values comprises selecting a larger value for P if the quality of a signal received by the UE is greater than a first threshold and selecting a smaller value for P if the quality of a signal received by the UE is less than a second threshold.

In some aspects, instructing the UE to use the selected P value comprises sending, to the UE, an indication of the selected P value.

In some aspects, sending an indication of the selected P value comprises sending the indication via a medium access control (MAC) control element (CE) and/or downlink control information (DCI).

In some aspects, the UE comprises a Type 1 UE or a Type 2 UE.

In an aspect, a method of wireless communication performed by a network entity includes receiving, from a user equipment (UE), information that specifies a plurality of positioning reference signal (PRS) measurement window period (P) values supported by the UE; selecting one of the plurality of P values to be used by the UE; and instructing the UE to use the selected P value.

In some aspects, the method includes receiving, from the UE, a confirmation of the P value to be used by the UE.

In some aspects, the network entity comprises a location management function (LMF) or a location management server (LMS).

In some aspects, receiving the information that specifies a plurality of P values comprises receiving an indication of which one or more of the plurality of P values is preferred by the UE.

In some aspects, selecting one of the plurality of P values comprises selecting a P value based on a mobility status of the UE and/or a quality of a signal received by the UE.

In some aspects, a mobility status of the UE comprises a position of the UE.

In some aspects, selecting one of the plurality of P values comprises selecting a larger value for P if the position of the UE is known with a certainty greater than a first threshold and selecting a smaller value for P if the position of the UE is known with a certainly less than a second threshold.

In some aspects, a mobility status of the UE comprises a velocity of the UE.

In some aspects, selecting one of the plurality of P values comprises selecting a smaller value for P if the velocity of the UE is greater than a first threshold and selecting a larger value for P if the velocity of the UE is less than a second threshold.

In some aspects, a quality of a signal received by the UE comprises a reference signal received power (RSRP), a reference signal received quality (RSRQ), and/or a signal to interference plus noise ratio (SINR).

In some aspects, selecting one of the plurality of P values comprises selecting a larger value for P if the quality of a signal received by the UE is greater than a first threshold and selecting a smaller value for P if the quality of a signal received by the UE is less than a second threshold.

In some aspects, instructing the UE to use the selected P value comprises sending, to the UE, an indication of the selected P value.

In some aspects, sending an indication of the selected P value comprises sending the indication via a medium access control (MAC) control element (CE) and/or downlink control information (DCI).

In some aspects, the UE comprises a Type 1 UE or a Type 2 UE.

In an aspect, a method of wireless communication performed by a network entity includes determining a modification to be made to a positioning reference signal (PRS) measurement window period (P) value for a user equipment (UE); and instructing the UE to make the modification to the P value.

In some aspects, the method includes receiving, from the UE, a confirmation of the modified P value to be used by the UE.

In some aspects, the network entity comprises a location management function (LMF) or a location management server (LMS).

In some aspects, determining a modification to be made to a P value comprises determining a modification to be made based on a mobility status of the UE and/or a quality of a signal received by the UE.

In some aspects, a mobility status of the UE comprises a position of the UE.

In some aspects, the modification to be made comprises increasing the value of P if the position of the UE is known with a certainty greater than a first threshold and decreasing the value for P if the position of the UE is known with a certainly less than a second threshold.

In some aspects, a mobility status of the UE comprises a velocity of the UE.

In some aspects, the modification to be made comprises decreasing the value of P if the velocity of the UE is greater than a first threshold and increasing the value of P if the velocity of the UE is less than a second threshold.

In some aspects, a quality of a signal received by the UE comprises a reference signal received power (RSRP), a reference signal received quality (RSRQ), and/or a signal to interference plus noise ratio (SINR).

In some aspects, the modification to be made comprises increasing the value of P if the quality of a signal received by the UE is greater than a first threshold and decreasing the value of P if the quality of a signal received by the UE is less than a second threshold.

In some aspects, instructing the UE to use the selected P value comprises sending, to the UE, an indication of the selected P value.

In some aspects, sending an indication of the selected P value comprises sending the indication via a medium access control (MAC) control element (CE) and/or downlink control information (DCI).

In some aspects, the UE comprises a Type 1 UE or a Type 2 UE.

In an aspect, a method of wireless communication performed by a network entity includes receiving, from a user equipment (UE), a plurality of positioning reference signal (PRS) measurements, the plurality of measurements comprising a measurement of a reference PRS transmitted by a serving cell of the UE and at least one measurement of a PRS transmitted by a neighboring cell of the serving cell; identifying, from the plurality of PRS measurements, an earliest PRS that satisfies a measurement quality threshold and a latest PRS that satisfies the measurement quality threshold; determining a minimum PRS symbol duration (K) value that contains the identified earliest PRS that satisfies a measurement quality threshold and latest PRS that satisfies the measurement quality threshold; and transmitting, to the UE, the value of K.

In some aspects, the method includes receiving, from the UE, a confirmation of the K value to be used by the UE.

In some aspects, the network entity comprises a location management function (LMF) or a location management server (LMS).

In some aspects, the measurement quality threshold comprises a threshold value for a reference signal received power (RSRP), a reference signal received quality (RSRQ), and/or a signal to interference plus noise ratio (SINR).

In some aspects, determining a minimum PRS symbol duration (K) value that contains the identified earliest PRS latest PRS that satisfy the measurement quality threshold comprises determining a slot timing that extends from the beginning of the identified earliest PRS that satisfies the threshold to the end of the identified latest PRS that satisfies the threshold.

In some aspects, the UE comprises a Type 1 UE.

In an aspect, a method of wireless communication performed by a network entity includes transmitting, to a user equipment (UE), information that specifies a plurality of positioning reference signal (PRS) symbol duration (K) values; selecting one of the plurality of K values to be used by the UE; and instructing the UE to use the selected K value.

In some aspects, the method includes receiving, from the UE, a confirmation of the K value to be used by the UE.

In some aspects, the network entity comprises a location management function (LMF) or a location management server (LMS).

In some aspects, transmitting the information that specifies a plurality of K values comprises broadcasting the information to a plurality of UEs.

In some aspects, selecting one of the plurality of K values comprises selecting a K value based on a quality of a signal received by the UE and/or a necessity of a signal received by the UE.

In some aspects, a quality of a signal received by the UE comprises a reference signal received power (RSRP), a reference signal received quality (RSRQ), and/or a signal to interference plus noise ratio (SINR).

In some aspects, instructing the UE to use the selected K value comprises sending, to the UE, an indication of the selected K value.

In some aspects, sending an indication of the selected K value comprises sending the indication via a medium access control (MAC) control element (CE) and/or downlink control information (DCI).

In some aspects, the UE comprises a Type 1 UE.

In an aspect, a method of wireless communication performed by a network entity includes determining a change of an uncertainty associated with a positioning reference signal (PRS) transmitted by a neighboring cell of the serving cell; and notifying a user equipment (UE) of the change of the uncertainty.

In some aspects, the method includes receiving, from the UE, an indication of a PRS symbol duration (K) to be used by the UE.

In some aspects, the network entity comprises a location management function (LMF) or a location management server (LMS).

In some aspects, determining the change of uncertainty associated with a PRS transmitted by a neighboring cell of the serving cell comprises determining the change of uncertainty based on a certainty of a position of the UE.

In some aspects, the uncertainty associated with a PRS transmitted by a neighboring cell decreases as the certainty of the position of the UE increases and increases as the certainty of the position of the UE decreases.

In some aspects, notifying the UE of the change of the uncertainty comprises sending the UE an updated value for a nr-DL-PRS-ExpectedRSTD-Uncertainty parameter associated with the PRS transmitted by the neighboring cell.

In some aspects, the UE comprises a Type 1 UE.

In an aspect, a method of wireless communication performed by a user equipment (UE) includes receiving, from a network entity, information that specifies a plurality of positioning reference signal (PRS) measurement window period (P) values; receiving, from the network entity, an indication of one of the plurality of P values to use; and using the indicated P value for the PRS measurement window period.

In some aspects, the method includes sending, to the network entity, a confirmation of the P value to be used by the UE.

In some aspects, the network entity comprises a location management function (L1V1F) or a location management server (LMS).

In some aspects, receiving the indication of the selected P value comprises receiving the indication via a medium access control (MAC) control element (CE) and/or downlink control information (DCI).

In some aspects, the UE comprises a Type 1 UE or a Type 2 UE.

In an aspect, a method of wireless communication performed by a user equipment (UE) includes sending, to a network entity, information that specifies a plurality of positioning reference signal (PRS) measurement window period (P) values supported by the UE; receiving, from the network entity, an indication of which of the plurality of P values to use; and using the indicated P value as the PRS measurement window period.

In some aspects, the method includes sending, to the network entity, a confirmation of the P value to be used by the UE.

In some aspects, sending the information that specifies a plurality of P values comprises sending an indication of which one or more of the plurality of P values is preferred by the UE.

In some aspects, the network entity comprises a location management function (LMF) or a location management server (LMS).

In some aspects, receiving an indication of the selected P value comprises receiving the indication via a medium access control (MAC) control element (CE) and/or downlink control information (DCI).

In some aspects, the UE comprises a Type 1 UE or a Type 2 UE.

In an aspect, a method of wireless communication performed by a user equipment (UE) includes receiving, from a network entity, an instruction to modify a positioning reference signal (PRS) measurement window period (P) value; and modifying the P value according to the instruction.

In some aspects, the method includes sending, to the network entity, a confirmation of the modified P value.

In some aspects, the network entity comprises a location management function (LMF) or a location management server (LMS).

In some aspects, receiving the instruction to modify a P value comprises receiving the instruction via a medium access control (MAC) control element (CE) and/or downlink control information (DCI).

In some aspects, the UE comprises a Type 1 UE or a Type 2 UE.

In an aspect, a method of wireless communication performed by a user equipment (UE) includes performing a plurality of positioning reference signal (PRS) measurements, the plurality of measurements comprising a measurement of a reference PRS transmitted by a serving cell of the UE and at least one measurement of a PRS transmitted by a neighboring cell of the serving cell; identifying, from the plurality of PRS measurements, an earliest PRS that satisfies a measurement quality threshold and a latest PRS that satisfies the measurement quality threshold; determining a minimum PRS symbol duration (K) value that contains the identified earliest PRS that satisfies a measurement quality threshold and latest PRS that satisfies the measurement quality threshold; and transmitting, to a network node, the value of K.

In some aspects, the method includes receiving, from the network node, an indication to use the value of K.

In some aspects, the method includes sending, to the network node, a confirmation that the value of K will be used.

In some aspects, the network entity comprises a location management function (LMF) or a location management server (LMS).

In some aspects, the measurement quality threshold comprises a threshold value for a reference signal received power (RSRP), a reference signal received quality (RSRQ), and/or a signal to interference plus noise ratio (SINR).

In some aspects, determining a minimum PRS symbol duration (K) value that contains the identified earliest PRS latest PRS that satisfy the measurement quality threshold comprises determining a slot timing that extends from the beginning of the identified earliest PRS that satisfies the threshold to the end of the identified latest PRS that satisfies the threshold.

In some aspects, the UE comprises a Type 1 UE.

In an aspect, a method of wireless communication performed by a user equipment (UE) includes receiving, from a network entity, information that specifies a plurality of positioning reference signal (PRS) symbol duration (K) values; receiving, from the network entity, an indication of one of the plurality of K values to use; and using the indicated K value for the PRS symbol duration.

In some aspects, the method includes sending, to the network entity, a confirmation of the K value to be used by the UE.

In some aspects, the network entity comprises a location management function (L1V1F) or a location management server (LMS).

In some aspects, receiving, from the network entity, an indication of one of the plurality of K values to use comprises receiving the indication via a medium access control (MAC) control element (CE) and/or downlink control information (DCI).

In some aspects, the UE comprises a Type 1 UE.

In an aspect, a method of wireless communication performed by a user equipment (UE) includes receiving, from a network entity, a notification of a change of an uncertainty associated with a positioning reference signal (PRS) transmitted by a neighboring cell of the serving cell; and modifying a positioning reference signal (PRS) symbol duration (K) value based on the notification.

In some aspects, the method includes sending, to the network entity, an indication of the modified K value.

In some aspects, the network entity comprises a location management function (LMF) or a location management server (LMS).

In some aspects,

In some aspects, the UE comprises a Type 1 UE.

In an aspect, a network entity includes a memory; at least one network interface; and at least one processor communicatively coupled to the memory and the at least one network interface, the at least one processor configured to: transmit, to a user equipment (UE), information that specifies a plurality of positioning reference signal (PRS) measurement window period (P) values; select one of the plurality of P values to be used by the UE; and instruct the UE to use the selected P value.

In an aspect, a network entity includes a memory; at least one network interface; and at least one processor communicatively coupled to the memory and the at least one network interface, the at least one processor configured to: receive, from a user equipment (UE), information that specifies a plurality of positioning reference signal (PRS) measurement window period (P) values supported by the UE; select one of the plurality of P values to be used by the UE; and instruct the UE to use the selected P value.

In an aspect, a network entity includes a memory; at least one network interface; and at least one processor communicatively coupled to the memory and the at least one network interface, the at least one processor configured to: determine a modification to be made to a positioning reference signal (PRS) measurement window period (P) value for a user equipment (UE); and instruct the UE to make the modification to the P value.

In an aspect, a network entity includes a memory; at least one network interface; and at least one processor communicatively coupled to the memory and the at least one network interface, the at least one processor configured to: receive, from a user equipment (UE), a plurality of positioning reference signal (PRS) measurements, the plurality of measurements comprising a measurement of a reference PRS transmitted by a serving cell of the UE and at least one measurement of a PRS transmitted by a neighboring cell of the serving cell; identify, from the plurality of PRS measurements, an earliest PRS that satisfies a measurement quality threshold and a latest PRS that satisfies the measurement quality threshold; determine a minimum PRS symbol duration (K) value that contains the identified earliest PRS that satisfies a measurement quality threshold and latest PRS that satisfies the measurement quality threshold; and transmit, to the UE, the value of K.

In an aspect, a network entity includes a memory; at least one network interface; and at least one processor communicatively coupled to the memory and the at least one network interface, the at least one processor configured to: transmit, to a user equipment (UE), information that specifies a plurality of positioning reference signal (PRS) symbol duration (K) values; select one of the plurality of K values to be used by the UE; and instruct the UE to use the selected K value.

In an aspect, a network entity includes a memory; at least one network interface; and at least one processor communicatively coupled to the memory and the at least one network interface, the at least one processor configured to: determine a change of an uncertainty associated with a positioning reference signal (PRS) transmitted by a neighboring cell of the serving cell; and notify a user equipment (UE) of the change of the uncertainty.

In an aspect, a user equipment (UE) includes a memory; at least one transceiver; and at least one processor communicatively coupled to the memory and the at least one transceiver, the at least one processor configured to: receive, from a network entity, information that specifies a plurality of positioning reference signal (PRS) measurement window period (P) values; receive, from the network entity, an indication of one of the plurality of P values to use; and use the indicated P value for the PRS measurement window period.

In an aspect, a user equipment (UE) includes a memory; at least one transceiver; and at least one processor communicatively coupled to the memory and the at least one transceiver, the at least one processor configured to: send, to a network entity, information that specifies a plurality of positioning reference signal (PRS) measurement window period (P) values supported by the UE; receive, from the network entity, an indication of which of the plurality of P values to use; and use the indicated P value as the PRS measurement window period.

In an aspect, a user equipment (UE) includes a memory; at least one transceiver; and at least one processor communicatively coupled to the memory and the at least one transceiver, the at least one processor configured to: receive, from a network entity, an instruction to modify a positioning reference signal (PRS) measurement window period (P) value; and modify the P value according to the instruction.

In an aspect, a user equipment (UE) includes a memory; at least one transceiver; and at least one processor communicatively coupled to the memory and the at least one transceiver, the at least one processor configured to: perform a plurality of positioning reference signal (PRS) measurements, the plurality of measurements comprising a measurement of a reference PRS transmitted by a serving cell of the UE and at least one measurement of a PRS transmitted by a neighboring cell of the serving cell; identify, from the plurality of PRS measurements, an earliest PRS that satisfies a measurement quality threshold and a latest PRS that satisfies the measurement quality threshold; determine a minimum PRS symbol duration (K) value that contains the identified earliest PRS that satisfies a measurement quality threshold and latest PRS that satisfies the measurement quality threshold; and transmit, to a network node, the value of K.

In an aspect, a user equipment (UE) includes a memory; at least one transceiver; and at least one processor communicatively coupled to the memory and the at least one transceiver, the at least one processor configured to: receive, from a network entity, information that specifies a plurality of positioning reference signal (PRS) symbol duration (K) values; receive, from the network entity, an indication of one of the plurality of K values to use; and use the indicated K value for the PRS symbol duration.

In an aspect, a user equipment (UE) includes a memory; at least one transceiver; and at least one processor communicatively coupled to the memory and the at least one transceiver, the at least one processor configured to: receive, from a network entity, a notification of a change of an uncertainty associated with a positioning reference signal (PRS) transmitted by a neighboring cell of the serving cell; and modify a positioning reference signal (PRS) symbol duration (K) value based on the notification.

In an aspect, a network entity includes means for transmitting, to a user equipment (UE), information that specifies a plurality of positioning reference signal (PRS) measurement window period (P) values; means for selecting one of the plurality of P values to be used by the UE; and means for instructing the UE to use the selected P value.

In an aspect, a network entity includes means for receiving, from a user equipment (UE), information that specifies a plurality of positioning reference signal (PRS) measurement window period (P) values supported by the UE; means for selecting one of the plurality of P values to be used by the UE; and means for instructing the UE to use the selected P value.

In an aspect, a network entity includes means for determining a modification to be made to a positioning reference signal (PRS) measurement window period (P) value for a user equipment (UE); and means for instructing the UE to make the modification to the P value.

In an aspect, a network entity includes means for receiving, from a user equipment (UE), a plurality of positioning reference signal (PRS) measurements, the plurality of measurements comprising a measurement of a reference PRS transmitted by a serving cell of the UE and at least one measurement of a PRS transmitted by a neighboring cell of the serving cell; means for identifying, from the plurality of PRS measurements, an earliest PRS that satisfies a measurement quality threshold and a latest PRS that satisfies the measurement quality threshold; means for determining a minimum PRS symbol duration (K) value that contains the identified earliest PRS that satisfies a measurement quality threshold and latest PRS that satisfies the measurement quality threshold; and means for transmitting, to the UE, the value of K.

In an aspect, a network entity includes means for transmitting, to a user equipment (UE), information that specifies a plurality of positioning reference signal (PRS) symbol duration (K) values; means for selecting one of the plurality of K values to be used by the UE; and means for instructing the UE to use the selected K value.

In an aspect, a network entity includes means for determining a change of an uncertainty associated with a positioning reference signal (PRS) transmitted by a neighboring cell of the serving cell; and means for notifying a user equipment (UE) of the change of the uncertainty.

In an aspect, a user equipment (UE) includes means for receiving, from a network entity, information that specifies a plurality of positioning reference signal (PRS) measurement window period (P) values; means for receiving, from the network entity, an indication of one of the plurality of P values to use; and means for using the indicated P value for the PRS measurement window period.

In an aspect, a user equipment (UE) includes means for sending, to a network entity, information that specifies a plurality of positioning reference signal (PRS) measurement window period (P) values supported by the UE; means for receiving, from the network entity, an indication of which of the plurality of P values to use; and means for using the indicated P value as the PRS measurement window period.

In an aspect, a user equipment (UE) includes means for receiving, from a network entity, an instruction to modify a positioning reference signal (PRS) measurement window period (P) value; and means for modifying the P value according to the instruction.

In an aspect, a user equipment (UE) includes means for performing a plurality of positioning reference signal (PRS) measurements, the plurality of measurements comprising a measurement of a reference PRS transmitted by a serving cell of the UE and at least one measurement of a PRS transmitted by a neighboring cell of the serving cell; means for identifying, from the plurality of PRS measurements, an earliest PRS that satisfies a measurement quality threshold and a latest PRS that satisfies the measurement quality threshold; means for determining a minimum PRS symbol duration (K) value that contains the identified earliest PRS that satisfies a measurement quality threshold and latest PRS that satisfies the measurement quality threshold; and means for transmitting, to a network node, the value of K.

In an aspect, a user equipment (UE) includes means for receiving, from a network entity, information that specifies a plurality of positioning reference signal (PRS) symbol duration (K) values; means for receiving, from the network entity, an indication of one of the plurality of K values to use; and means for using the indicated K value for the PRS symbol duration.

In an aspect, a user equipment (UE) includes means for receiving, from a network entity, a notification of a change of an uncertainty associated with a positioning reference signal (PRS) transmitted by a neighboring cell of the serving cell; and means for modifying a positioning reference signal (PRS) symbol duration (K) value based on the notification.

In an aspect, a non-transitory computer-readable medium containing instructions stored thereon, for causing at least one processor in a network entity to: transmit, to a user equipment (UE), information that specifies a plurality of positioning reference signal (PRS) measurement window period (P) values; select one of the plurality of P values to be used by the UE; and instruct the UE to use the selected P value.

In an aspect, a non-transitory computer-readable medium containing instructions stored thereon, for causing at least one processor in a network entity to: receive, from a user equipment (UE), information that specifies a plurality of positioning reference signal (PRS) measurement window period (P) values supported by the UE; select one of the plurality of P values to be used by the UE; and instruct the UE to use the selected P value.

In an aspect, a non-transitory computer-readable medium containing instructions stored thereon, for causing at least one processor in a network entity to: determine a modification to be made to a positioning reference signal (PRS) measurement window period (P) value for a user equipment (UE); and instruct the UE to make the modification to the P value.

In an aspect, a non-transitory computer-readable medium containing instructions stored thereon, for causing at least one processor in a network entity to: receive, from a user equipment (UE), a plurality of positioning reference signal (PRS) measurements, the plurality of measurements comprising a measurement of a reference PRS transmitted by a serving cell of the UE and at least one measurement of a PRS transmitted by a neighboring cell of the serving cell; identify, from the plurality of PRS measurements, an earliest PRS that satisfies a measurement quality threshold and a latest PRS that satisfies the measurement quality threshold; determine a minimum PRS symbol duration (K) value that contains the identified earliest PRS that satisfies a measurement quality threshold and latest PRS that satisfies the measurement quality threshold; and transmit, to the UE, the value of K.

In an aspect, a non-transitory computer-readable medium containing instructions stored thereon, for causing at least one processor in a network entity to: transmit, to a user equipment (UE), information that specifies a plurality of positioning reference signal (PRS) symbol duration (K) values; select one of the plurality of K values to be used by the UE; and instruct the UE to use the selected K value.

In an aspect, a non-transitory computer-readable medium containing instructions stored thereon, for causing at least one processor in a network entity to: determine a change of an uncertainty associated with a positioning reference signal (PRS) transmitted by a neighboring cell of the serving cell; and notify a user equipment (UE) of the change of the uncertainty.

In an aspect, a non-transitory computer-readable medium containing instructions stored thereon, for causing at least one processor in a user equipment (UE) to: receive, from a network entity, information that specifies a plurality of positioning reference signal (PRS) measurement window period (P) values; receive, from the network entity, an indication of one of the plurality of P values to use; and use the indicated P value for the PRS measurement window period.

In an aspect, a non-transitory computer-readable medium containing instructions stored thereon, for causing at least one processor in a user equipment (UE) to: send, to a network entity, information that specifies a plurality of positioning reference signal (PRS) measurement window period (P) values supported by the UE; receive, from the network entity, an indication of which of the plurality of P values to use; and use the indicated P value as the PRS measurement window period.

In an aspect, a non-transitory computer-readable medium containing instructions stored thereon, for causing at least one processor in a user equipment (UE) to: receive, from a network entity, an instruction to modify a positioning reference signal (PRS) measurement window period (P) value; and modify the P value according to the instruction.

In an aspect, a non-transitory computer-readable medium containing instructions stored thereon, for causing at least one processor in a user equipment (UE) to: perform a plurality of positioning reference signal (PRS) measurements, the plurality of measurements comprising a measurement of a reference PRS transmitted by a serving cell of the UE and at least one measurement of a PRS transmitted by a neighboring cell of the serving cell; identify, from the plurality of PRS measurements, an earliest PRS that satisfies a measurement quality threshold and a latest PRS that satisfies the measurement quality threshold; determine a minimum PRS symbol duration (K) value that contains the identified earliest PRS that satisfies a measurement quality threshold and latest PRS that satisfies the measurement quality threshold; and transmit, to a network node, the value of K.

In an aspect, a non-transitory computer-readable medium containing instructions stored thereon, for causing at least one processor in a user equipment (UE) to: receive, from a network entity, information that specifies a plurality of positioning reference signal (PRS) symbol duration (K) values; receive, from the network entity, an indication of one of the plurality of K values to use; and use the indicated K value for the PRS symbol duration.

In an aspect, a non-transitory computer-readable medium containing instructions stored thereon, for causing at least one processor in a user equipment (UE) to: receive, from a network entity, a notification of a change of an uncertainty associated with a positioning reference signal (PRS) transmitted by a neighboring cell of the serving cell; and modify a positioning reference signal (PRS) symbol duration (K) value based on the notification.

Other objects and advantages associated with the aspects disclosed herein will be apparent to those skilled in the art based on the accompanying drawings and detailed description.

What is claimed is:

1. A method of wireless communication performed by a network entity, the method comprising:
    determining a positioning reference signal (PRS) measurement window period value (P) and a minimum PRS symbol duration value (K) to be used by a user equipment (UE), wherein K defines a duration of time that the UE buffers symbols within a slot or over multiple slots; and
    transmitting, to the UE, the P, or an indication thereof, and the K, or an indication thereof, to be used by the UE for measuring at least one PRS.

2. The method of claim 1, further comprising receiving, from the UE, a confirmation of a value of P, a value of K, or both, that the UE is using for PRS measurements.

3. The method of claim 1, wherein determining P comprises selecting P from a plurality of PRS measurement window periods supported by the UE.

4. The method of claim 1, wherein determining the P and the K comprises determining P, K, or both, based on a mobility status of the UE, a quality of a signal received by the UE, a necessity of the signal received by the UE, or both.

5. The method of claim 4, wherein determining P, K, or both, based on the mobility status of the UE comprises determining P based on a position of the UE, a velocity of the UE, or both.

6. The method of claim 4, wherein determining P, K, or both, based on the quality of the signal received by the UE comprises determining P, K, or both, based on the quality of a reference signal received power (RSRP), a reference signal received quality (RSRQ), a signal to interference plus noise ratio (SINR), or combinations thereof.

7. The method of claim 1, wherein transmitting the indication of the P and the K to be used by the UE comprises sending the indication via a medium access control (MAC) control element (CE), downlink control information (DCI), or combinations thereof.

8. The method of claim 1, further comprising:
    prior to transmitting the indication of the P and the K to be used by the UE, receiving, from the UE, information that specifies a plurality of PRS measurement window periods supported by the UE; and wherein determining P comprises selecting one of the plurality of PRS measurement window periods supported by the UE.

9. The method of claim 8, wherein receiving the information that specifies the plurality of PRS measurement window periods supported by the UE further comprises receiving an indication of which one or more of the plurality of PRS measurement window periods supported by the UE is preferred by the UE.

10. The method of claim 1, further comprising:
receiving, from the UE, a plurality of PRS measurements, the plurality of PRS measurements comprising a measurement of a reference PRS transmitted by a serving cell of the UE and at least one measurement of a PRS transmitted by a neighboring cell of the serving cell;
identifying, from the plurality of PRS measurements, an earliest PRS that satisfies a measurement quality threshold and a latest PRS that satisfies the measurement quality threshold;
determining a value of K that provides a PRS symbol duration sufficient to contain the earliest PRS that satisfies the measurement quality threshold and the latest PRS that satisfies the measurement quality threshold; and
transmitting, to the UE, the value of K.

11. The method of claim 10, wherein determining the value of K that provides the PRS symbol duration sufficient to contain the earliest PRS that satisfies the measurement quality threshold and the latest PRS that satisfies the measurement quality threshold comprises determining a slot timing that extends from a beginning of the earliest PRS that satisfies the measurement quality threshold to an end of the latest PRS that satisfies the measurement quality threshold.

12. The method of claim 1, further comprising:
determining a change of an uncertainty associated with a PRS transmitted by a neighboring cell of a serving cell of the UE; and
notifying the UE of the change of the uncertainty.

13. The method of claim 12, wherein determining the change of the uncertainty associated with the PRS transmitted by the neighboring cell of the serving cell of the UE comprises determining the change of the uncertainty based on a certainty of a position of the UE.

14. The method of claim 12, wherein notifying the UE of the change of the uncertainty comprises sending the UE an updated value for a nr-DL-PRS-ExpectedRSTD-Uncertainty parameter associated with the PRS transmitted by the neighboring cell.

15. A method of wireless communication performed by a user equipment (UE), the method comprising:
receiving, from a network entity, a positioning reference signal (PRS) measurement window period value (P), or an indication thereof, and a minimum PRS symbol duration value (K), or an indication thereof, wherein K defines a duration of time that the UE buffers symbols within a slot or over multiple slots; and
measuring, based at least in part on the P and the K, at least one PRS.

16. The method of claim 15, further comprising sending, to the network entity, a confirmation that the UE is using the P and the K for measuring at least one PRS.

17. The method of claim 15, wherein receiving the indication of the P and the K comprises receiving the indication of the P and the K via a medium access control (MAC) control element (CE), downlink control information (DCI), or combinations thereof.

18. The method of claim 15, further comprising:
prior to receiving the indication of the P and the K, sending, to the network entity, information that specifies a plurality of PRS measurement window periods supported by the UE.

19. The method of claim 18, wherein sending the information that specifies the plurality of PRS measurement window periods supported by the UE further comprises sending an indication of which one or more of the plurality of PRS measurement window periods supported by the UE is preferred by the UE.

20. The method of claim 15, further comprising:
receiving, from the network entity, an instruction to modify a value of P being used by the UE, a value of K being used by the UE, or both; and
modifying the value of P, the value of K, or both, according to the instruction.

21. The method of claim 20, further comprising sending, to the network entity, a confirmation that the value of P was modified, that the value of K was modified, or both.

22. The method of claim 20, wherein receiving the instruction to modify the value of P being used by the UE, the value of K being used by the UE, or both comprises receiving the instruction via a medium access control (MAC) control element (CE), downlink control information (DCI), or combinations thereof.

23. The method of claim 15, further comprising:
performing a plurality of PRS measurements, the plurality of PRS measurements comprising a measurement of a reference PRS transmitted by a serving cell of the UE and at least one measurement of a PRS transmitted by a neighboring cell of the serving cell;
identifying, from the plurality of PRS measurements, an earliest PRS that satisfies a measurement quality threshold and a latest PRS that satisfies the measurement quality threshold;
determining a value of K that provides a PRS symbol duration sufficient to contain the earliest PRS that satisfies the measurement quality threshold and the latest PRS that satisfies the measurement quality threshold; and
transmitting, to a network node, the value of K.

24. The method of claim 23, wherein determining the value of K that provides the PRS symbol duration sufficient to contain the earliest PRS that satisfies the measurement quality threshold and the latest PRS that satisfies the measurement quality threshold comprises determining a slot timing that extends from a beginning of the earliest PRS that satisfies the measurement quality threshold to an end of the latest PRS that satisfies the measurement quality threshold.

25. The method of claim 23, further comprising receiving, from the network node, an indication to use the value of K.

26. The method of claim 23, wherein the measurement quality threshold comprises a threshold value for a reference signal received power (RSRP), a reference signal received quality (RSRQ), a signal to interference plus noise ratio (SINR), or combinations thereof.

27. The method of claim 15, further comprising:
receiving, from the network entity, a notification of a change of an uncertainty associated with a PRS transmitted by a neighboring cell of a serving cell of the UE; and
modifying a value of K based on the notification.

28. The method of claim 27, wherein receiving the notification of the change of the uncertainty comprises receiving an updated value for a nr-DL-PRS-ExpectedRSTD-Uncertainty parameter associated with the PRS transmitted by the neighboring cell.

29. A network entity, comprising:
a memory;
at least one transceiver; and
at least one processor communicatively coupled to the memory and the at least one transceiver, the at least one processor configured to:
  determine a positioning reference signal (PRS) measurement window period value (P) and a minimum PRS symbol duration value (K) to be used by a user equipment (UE), wherein K defines a duration of time that the UE buffers symbols within a slot or over multiple slots; and
  transmit, via the at least one transceiver, to the UE, an indication of the P and the K to be used by the UE for measuring at least one PRS.

30. A user equipment (UE), comprising:
a memory;
at least one transceiver; and
at least one processor communicatively coupled to the memory and the at least one transceiver, the at least one processor configured to:
  receive, via the at least one transceiver, from a network entity, an indication of a positioning reference signal (PRS) measurement window period value (P) and a minimum PRS symbol duration value (K), wherein K defines a duration of time that the UE buffers symbols within a slot or over multiple slots; and
  use the P and the K for measuring at least one PRS.

* * * * *